(12) United States Patent
Tamura

(10) Patent No.: US 8,531,702 B2
(45) Date of Patent: Sep. 10, 2013

(54) INFORMATION PROCESSING APPARATUS, IMAGE PROCESSING APPARATUS, AND INFORMATION PROCESSING METHOD THEREOF

(75) Inventor: Yuu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 12/669,183

(22) PCT Filed: Sep. 29, 2008

(86) PCT No.: PCT/JP2008/068120
§ 371 (c)(1),
(2), (4) Date: Jan. 14, 2010

(87) PCT Pub. No.: WO2009/048030
PCT Pub. Date: Apr. 16, 2009

(65) Prior Publication Data
US 2010/0195147 A1 Aug. 5, 2010

(30) Foreign Application Priority Data

Oct. 12, 2007 (JP) .................................. 2007-267120

(51) Int. Cl.
  *G06F 3/12* (2006.01)
  *G06F 9/455* (2006.01)
  *G06K 15/00* (2006.01)
(52) U.S. Cl.
  USPC .............................. 358/1.15; 358/1.14; 718/1
(58) Field of Classification Search
  USPC ..................................... 358/1.14, 1.15; 718/1
  See application file for complete search history.

(56) References Cited

U.S. PATENT DOCUMENTS

2003/0103231 A1* 6/2003 Simpson et al. ............. 358/1.15
2006/0285127 A1* 12/2006 Sugimoto ....................... 358/1.1

FOREIGN PATENT DOCUMENTS

| EP | 854415 B | 5/2004 |
|---|---|---|
| JP | 2000-047771 A | 2/2000 |
| JP | 2000-187573 A | 7/2000 |
| JP | 2004-288052 A | 10/2001 |
| JP | 2005-222284 A | 8/2005 |
| JP | 2007-072565 A | 3/2007 |

OTHER PUBLICATIONS

PCT International Search Report and Written Opinion of the International Searching Authority, mailed on May 19, 2009 in PCT/JP2008/068120.
Japanese Office Action dated Oct. 14, 2011 concerning Japanese patent Application No. 2007-267120.

* cited by examiner

*Primary Examiner* — Twyler Haskins
*Assistant Examiner* — Justin Katzwhite
(74) *Attorney, Agent, or Firm* — Fitzpatrick, Cella, Harper & Scinto

(57) ABSTRACT

When receiving a cancel request of a job from a user, a determination is made on whether or not the job as a target for the received cancel request is a virtual job to be processed by cooperating functions of a plurality of image processing apparatus. When it is determined that the job as a target for the cancel request is a virtual job, information regarding the plurality of image processing apparatuses which cooperates to execute the virtual job and an order in which the cancel instruction for the virtual job is to be transmitted to the plurality of image processing apparatuses are acquired, and based on the acquired order, a cancel instruction for the virtual job is transmitted to any of the plurality of image processing apparatuses.

21 Claims, 18 Drawing Sheets

FIG. 3
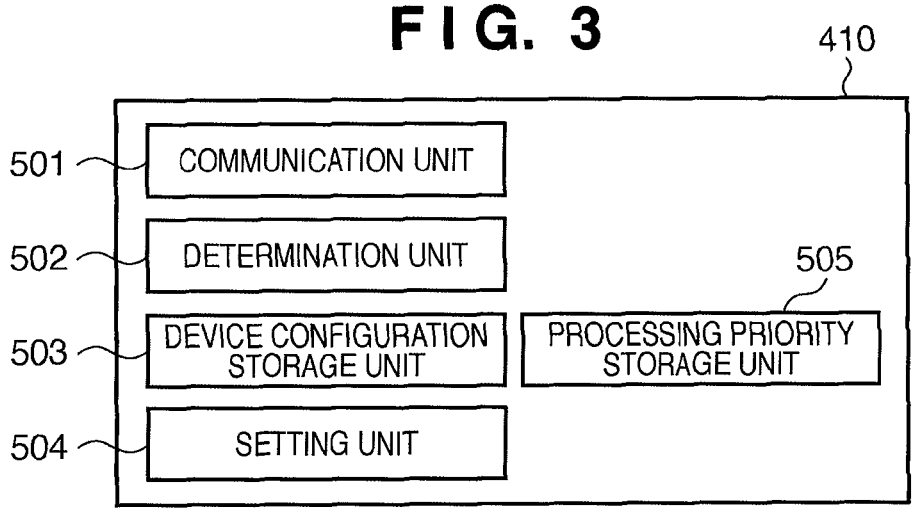
FIG. 4
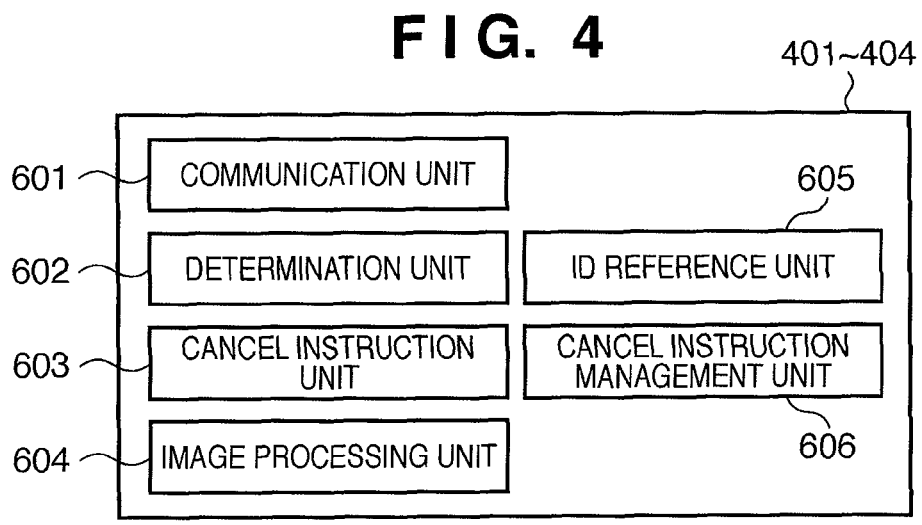
FIG. 5
| VIRTUAL DEVICE ID | Scan | Render | Print |
|---|---|---|---|
| VIRTUAL DEVICE 1 | DEVICE 1 | DEVICE 1 | DEVICE 2 |
| VIRTUAL DEVICE 2 | DEVICE 1 | DEVICE 3 | DEVICE 4 |
| ⋮ | ⋮ | ⋮ | ⋮ |
| ⋮ | ⋮ | ⋮ | ⋮ |
| ⋮ | ⋮ | ⋮ | ⋮ |

FIG. 6

| | | |
|---|---|---|
| Scan | DEVICE 1 | |
| Render | DEVICE 3 | ~702 |
| Print | DEVICE 4 | |

| |
|---|
| DEVICE 4, DEVICE 3, DEVICE 1 | ~703

FIG. 8

| | | |
|---|---|---|
| 704a — VIRTUAL JOB ID | 005 | ~704 |
| 704b — DEVICE CONFIGURATION | DEVICE 1, DEVICE 3, DEVICE 4 | |
| 704c — ACTUAL JOB | | |

FIG. 9

| | | |
|---|---|---|
| 705a — VIRTUAL JOB ID | 005 | ~705 |
| 705b — PROCESSING ORDER | DEVICE 4, DEVICE 3, DEVICE 1 | |
| 705c — CANCEL INSTRUCTION | | |

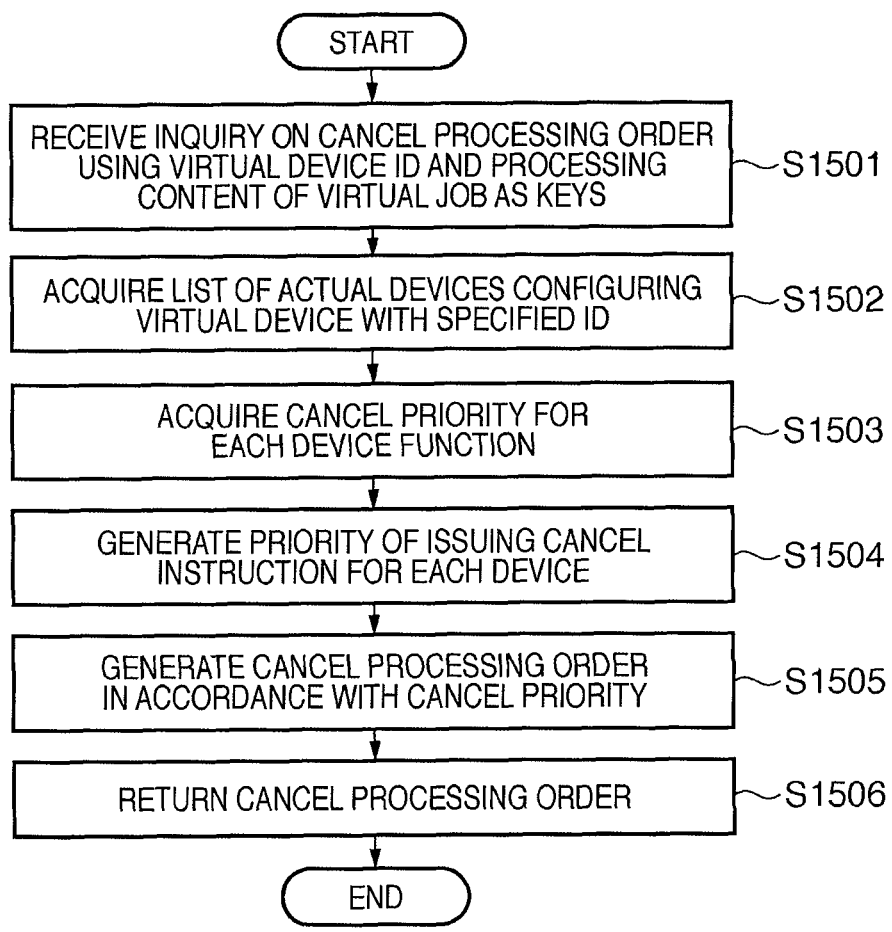

FIG. 18

| 1801a | VIRTUAL JOB ID | 009 |
|---|---|---|
| 1801b | PROCESSING ORDER | DEVICE 4, DEVICE 3, DEVICE 1 |

```
START
  ↓
ACQUIRE ID OF ISSUED VIRTUAL JOB — S1901
  ↓
ACQUIRE PROCESSING CONTENT OF
ISSUED VIRTUAL JOB — S1902
  ↓
ACQUIRE ID OF VIRTUAL DEVICE
HAVING EXECUTED VIRTUAL JOB — S1903
  ↓
INQUIRE CANCEL PROCESSING ORDER OF
SPECIFIED VIRTUAL DEVICE — S1904
  ↓
GENERATE CANCEL PREPARATION INSTRUCTION
FROM VIRTUAL JOB ID AND CANCEL
PROCESSING ORDER — S1905
  ↓
FORWARD CANCEL PREPARATION INSTRUCTION
TO EACH DEVICE CONFIGURING VIRTUAL DEVICE — S1906
  ↓
END
```

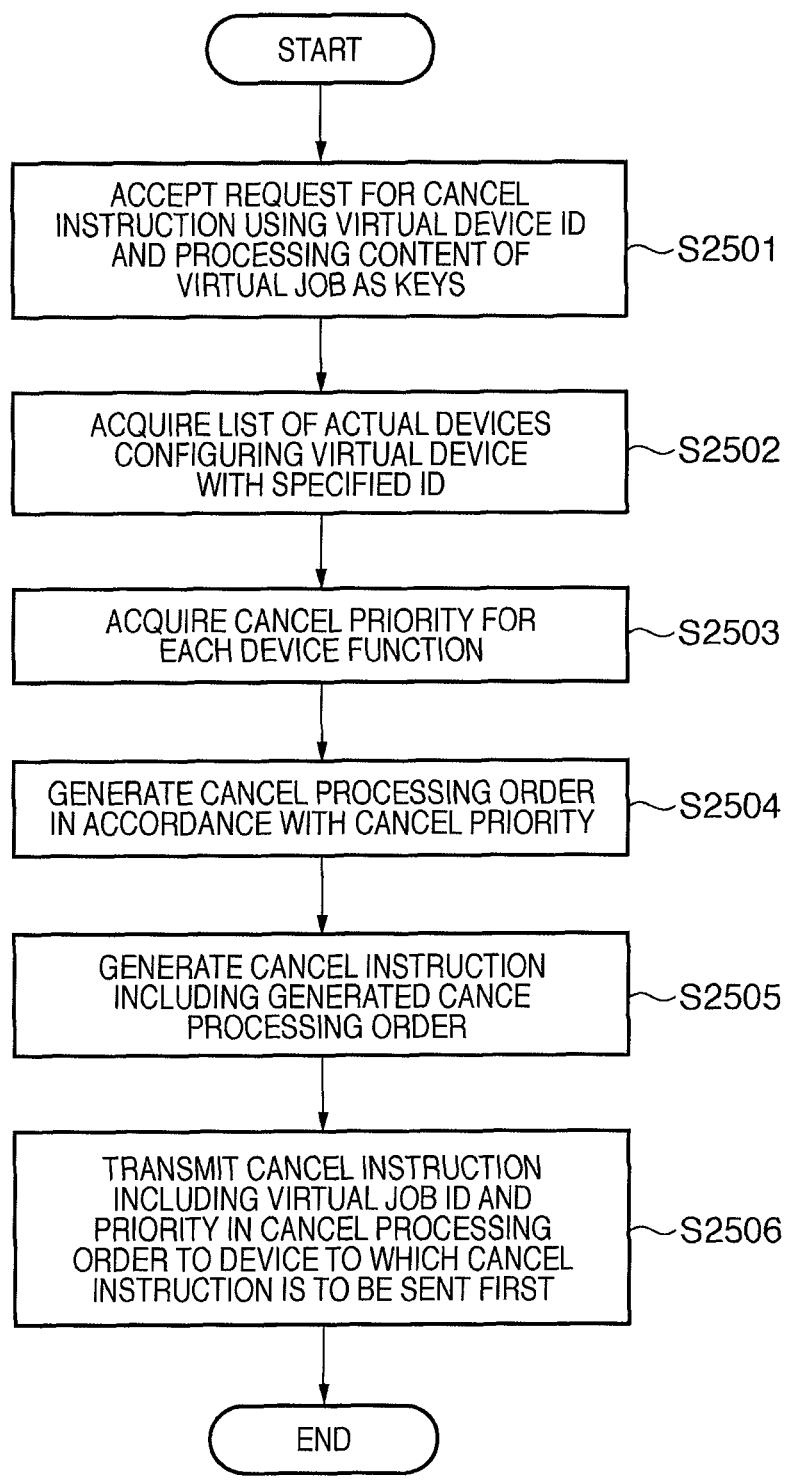

INFORMATION PROCESSING APPARATUS, IMAGE PROCESSING APPARATUS, AND INFORMATION PROCESSING METHOD THEREOF

This application is a National Stage application under 35 U.S.C. §371 of International Application No. PCT/JP2008/068120, filed on Sep. 29, 2008, which claims priority to Japanese Application No. 2007-267120, filed on Oct. 12, 2007, the contents of each of the foregoing applications being incorporated by reference herein.

TECHNICAL FIELD

The present invention relates to an information processing apparatus that gives the instruction for cancellation of a job to devices executing job processing cooperatively, an image processing apparatus, and an information processing method thereof.

BACKGROUND ART

Conventionally, there are methods of realizing a network copy function, in which an image is read by a scanner connected to a network and printed by an arbitrary printer, through a simple operation similar to that of an integrated-type copier. For example, many methods have been realized in which a single virtual device is constituted by an input device such as a scanner or a digital camera and an output device such as a printer or a facsimile apparatus connected to each other via a communication medium.

For example, in Japanese Patent Laid-Open No. 2000-47771, a system in which input devices and output devices are connected to each other via a communication medium decides and notifies a system user of a function constituted by a combination of an input device and an output device.

In addition, for example, Japanese Patent Laid-Open No. 2000-187573 provides a multifunctional system enabling a desired function to be set on a network with ease, and a method for setting a function thereof.

However, even with a virtual device such as described above, there are situations where a user wishes to cancel a job input by himself/herself in the same manner as a conventional device.

In such a case, canceling a job to be processed by a virtual device conceivably involves constantly monitoring which actual device the job is being processed at. However, processing for constantly monitoring job statuses of all virtual devices becomes complicated.

In addition, although there are methods to issue a job cancel instruction to all actual devices constituting a virtual device without having to perform status monitoring, the cancel instruction ends up being transmitted even to actual devices not processing the job, resulting in the creation of unnecessary traffic.

Furthermore, there is a problem in that a job of a virtual device can be cancelled only by the actual device processing the job.

DISCLOSURE OF INVENTION

The present invention has been made in consideration of the above problems, and an object thereof is to provide an information processing method and an information processing apparatus capable of preventing an increase in traffic and performing cancellation of a job in a system constituted by input devices and output devices without having to monitor job statuses.

Another object of the present invention is to provide an information processing apparatus, an image processing apparatus, and an information processing method thereof, which enable a cancel operation to be performed from any actual device in the system.

In order to achieve the problem described above, an information processing apparatus according to the present invention comprises: first reception means adapted to receive a cancel request of a job from a user; first determination means adapted to determine whether or not the job as a target for the cancel request received by the reception means is a virtual job processed by cooperating functions of a plurality of image processing apparatuses; acquisition means adapted to acquire, when the job is determined to be a virtual job by the first determination means, information regarding a plurality of image processing apparatuses which cooperates to execute the virtual job and an order in which a cancel instruction for the virtual job is to be transmitted to the plurality of image processing apparatuses; and first transmission means adapted to transmit the cancel instruction for the virtual job to any of the plurality of the image processing apparatuses based on the order acquired by the acquisition means.

An information processing method according to the present invention comprises: a first reception step of receiving a cancel request of a job from a user; a first determination step of determining whether or not the job as a target for the cancel request received in the reception step is a virtual job processed by cooperating functions of a plurality of image processing apparatuses; an acquisition step of acquiring, when the job is determined to be a virtual job in the first determination step, information regarding a plurality of image processing apparatuses to cooperate to execute the virtual job and an order in which a cancel instruction for the virtual job is to be transmitted to the plurality of image processing apparatuses; and a first transmission step of transmitting the cancel instruction for the virtual job to any of the plurality of the image processing apparatuses based on the order acquired in the acquisition step.

A computer-readable storage medium according to the present invention stores a computer-executable program for causing a computer to execute the steps of the above information processing method.

An image processing apparatus according to the present invention comprises: reception means adapted to receive a cancel instruction for canceling a job; second determination means adapted to determine whether or not the job as a target for the cancel instruction received by the reception means is a virtual job to be executed by cooperating functions of a plurality of image processing apparatuses; third determination means adapted to determine, when the job as a target for the cancel instruction is determined to be a virtual job by the second determination means, whether or not the virtual job is currently being processed by the self apparatus; cancel means adapted to cancel, when the virtual job is determined as being processed by the self apparatus by the third determination means, the virtual job currently being processed; decision means adapted to decide, when the virtual job is determined as not being processed by the self apparatus by the third determination means, an image processing apparatus other than the self apparatus to which a cancel instruction is to be transmitted next to the self apparatus based on the order included in the cancel instruction in which the cancel instruction for the virtual job is to be transmitted to the plurality of image processing apparatuses; and third transmission means adapted to transmit the cancel instruction for the virtual job to the image processing apparatus other than the self apparatus which was decided by the decision means.

An information processing method of an image processing apparatus according to the present invention, comprises: a reception step of receiving a cancel instruction for canceling a job; a second determination step of determining whether or not the job as a target for the cancel instruction received in the reception step is a virtual job to be executed by cooperating functions of a plurality of image processing apparatuses; a third determination step of determining, when the job as a target for the cancel instruction is determined to be a virtual job in the second determination step, whether or not the virtual job is currently being processed by the self apparatus; a cancel step of canceling, when the virtual job is determined as being processed by the self apparatus in the third determination step, the virtual job currently being processed; a decision step of deciding, when the virtual job is determined as not being processed by the self apparatus in the third determination step, an image processing apparatus other than the self apparatus to which a cancel instruction is to be transmitted next to the self apparatus based on the order included in the cancel instruction in which the cancel instruction for the virtual job is to be transmitted to the plurality of image processing apparatuses; and a third transmission step of transmitting the cancel instruction for the virtual job to the image processing apparatus other than the self apparatus which was decided in the decision step.

A computer-readable storage medium according to the present invention stores a computer-executable program for causing a computer to execute the steps of the above information processing method.

An image processing apparatus according to the present invention comprises: reception means adapted to receive, based on an issuance of a virtual job to be executed by cooperating functions of a plurality of image processing apparatuses, information indicating the virtual job issued to the plurality of image processing apparatuses which cooperates when executing the virtual job; display control means adapted to display a list of jobs based on the information indicating a virtual job received by the reception means and information on a job input to the self apparatus; fifth determination means adapted to determine, when receiving a cancel instruction for the virtual job from the user based on the list of jobs displayed by the display control means, whether or not the virtual job is currently being processed by the self apparatus; cancel means adapted to cancel, when the virtual job is determined as being processed by the self apparatus by the fifth determination means, the virtual job currently being processed; decision means adapted to decide, when the virtual job is determined as not being processed by the self apparatus by the fifth determination means, an image processing apparatus other than the self apparatus to which a cancel instruction is to be transmitted based on information regarding the plurality of image processing apparatuses which cooperates to execute the virtual job and on an order in which the cancel instruction for the virtual job is to be transmitted to the plurality of image processing apparatuses; and fourth transmission means adapted to transmit the cancel instruction for the virtual job to the image processing apparatus other than the self apparatus which was decided by the decision means.

An information processing method of an image processing apparatus according to the present invention, comprises: a reception step of receiving, based on an issuance of a virtual job to be executed by cooperating functions of a plurality of image processing apparatuses, information indicating the virtual job issued to the plurality of image processing apparatuses which cooperates when executing the virtual job; a display control step of displaying a list of jobs based on the information indicating a virtual job received in the reception step and information on a job input to the self apparatus; a fifth determination step of determining, when receiving a cancel instruction for the virtual job from the user based on the list of jobs displayed in the display control step, whether or not the virtual job is currently being processed by the self apparatus; a cancel step of canceling, when the virtual job is determined as being processed by the self apparatus in the fifth determination step, the virtual job currently being processed; a decision step of deciding, when the virtual job is determined as not being processed by the self apparatus in the fifth determination step, an image processing apparatus other than the self apparatus to which a cancel instruction is to be transmitted based on information regarding the plurality of image processing apparatuses which cooperates to execute the virtual job and on an order in which the cancel instruction for the virtual job is to be transmitted to the plurality of image processing apparatuses; and a fourth transmission step of transmitting the cancel instruction for the virtual job to the image processing apparatus other than the self apparatus which was decided in the decision step.

A computer-readable storage medium according to the present invention stores a computer-executable program for causing a computer to execute the steps of the above information processing method.

According to the present invention, an increase in traffic can be prevented and job cancellation in a system constituted by input devices and output devices can be performed without having to monitor job statuses. In addition, a cancel operation can now be performed from any actual device in the system.

Further features of the present invention will become apparent from the following description of exemplary embodiments with reference to the attached drawings.

BRIEF DESCRIPTION OF DRAWINGS

FIG. 3 is a diagram showing a module configuration example of a virtual device configuration management server according to the present embodiment;

FIG. 4 is a diagram showing a module configuration example of an image processing apparatus according to the present embodiment;

FIG. 5 is a diagram showing an example of virtual device configuration data according to the present embodiment;

FIG. 6 is a diagram showing an example of a virtual device configuration record according to the present embodiment;

FIG. 7 is a diagram showing an example of cancel processing order data according to the present embodiment;

FIG. 8 is a diagram showing an example of a virtual job according to the present embodiment;

FIG. 9 is a diagram showing an example of a cancel instruction according to the present embodiment;

FIG. 15 shows an example of cancel priority data for each virtual device function according to a second embodiment;

FIG. 16 is a flowchart showing an example of a processing procedure of a virtual device configuration management server for generating a cancel processing order according to the second embodiment;

FIG. 18 is a diagram showing an example of a cancel preparation instruction according to a third embodiment;

FIG. 19 is a flowchart showing an example of a processing procedure of an image processing apparatus for generating a cancel preparation instruction upon issuing a job according to the third embodiment;

FIG. 24 is a flowchart showing an example of a processing procedure of a virtual device configuration management server having received a request of cancel instruction according to the fourth embodiment.

BEST MODE FOR CARRYING OUT THE INVENTION

Embodiments of the present invention will now be described in detail with reference to the attached drawings.

<Configuration Example of an Image Processing Apparatus According to the Present Embodiment>

Figure 1:
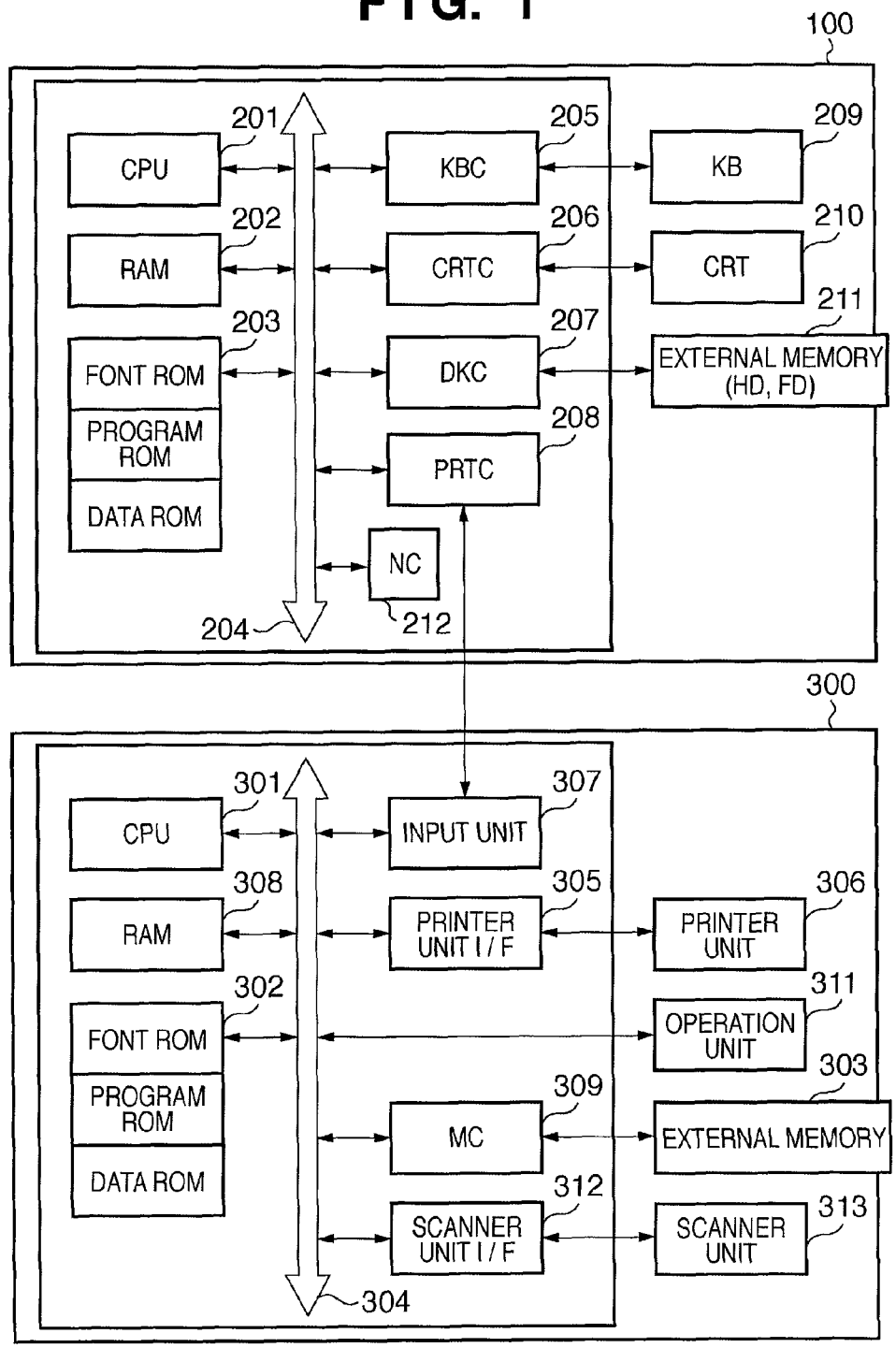
FIG. 1 is a block diagram showing a configuration example of a computer and an image forming apparatus which constitute an image processing apparatus.

An image processing apparatus according to the present embodiment is realized on a system constituted by a personal computer (hereinafter PC) and an image forming apparatus configured as shown in FIG. 1.

FIG. 1 shows a computer 100 including a PC and an image forming apparatus 300 connected via a network or the like so as to be communicable with each other.

(Configuration Example of Computer 100)

A configuration of the computer 100 will be described first. The hardware block diagram shown in FIG. 1 is assumed to correspond to a hardware block diagram of a general information processing apparatus, and a hardware configuration of a general information processing apparatus can be applied to the computer 100 according to the present embodiment.

In FIG. 1, a CPU 201 executes a program such as an OS, an application, or the like either stored in a program ROM of a ROM 203 or loaded from a hard disk 211 onto a RAM 202. An OS is an abbreviation of an operating system that runs on a computer. Hereinafter, an operating system shall be referred to as an OS. Processing of the respective flowcharts described later can be realized by executing this program. The RAM 202 functions as a main memory, a work area, or the like of the CPU 201. The CPU 201 controls each block to be connected to a system bus 204.

A keyboard controller (KBC) 205 controls key input made from a keyboard 209 or a pointing device, not shown. A CRT controller (CRTC) 206 controls display on a CRT display 210. A disk controller (DKC) 207 controls program access and/or data access from a storage medium such as a hard disk (HD) 211 or a floppy (registered trademark) disk (FD) which stores various data. A printer controller (PRTC) 208 controls exchanging of signals between the connected image forming apparatus 300. A network controller (NC) 212 is connected to a network so as to execute communication control processing between other devices connected to the network.

(Configuration Example of the Image Forming Apparatus 300)

A configuration of the image forming apparatus 300 will now be described.

As depicted, in the image forming apparatus 300, reference numeral 301 denotes a CPU of the image forming apparatus 300 that controls respective blocks to be connected to a system bus 304 based on a control program stored in a ROM 302 or an external memory 303. An image signal generated by the processing performed by the CPU 301 is output via a printer unit I/F 305 as output information to a printer unit (image forming apparatus engine) 306. In addition, the CPU 301 is capable of performing communication processing between the host computer 100 via an input unit 307 and notifying the host computer 100 of information and the like in the image forming apparatus 300.

A program ROM in the ROM 302 stores a control program or the like of the CPU 301. A font ROM in the ROM 302 stores font data or the like to be used when generating output information. A data ROM in the ROM 302 stores information or the like to be used on the host computer 100 in a case where the image forming apparatus does not include the external memory 303 that is a hard disk or the like.

A RAM 308 is a RAM that functions as a main memory, a work area, or the like of the CPU 301, and is configured so that memory capacity thereof can be expanded by an optional RAM to be connected to an expansion port, not shown. In addition, the RAM 308 is also used as an output information expansion area, an environmental data storage area, an NVRAM, or the like.

Access to the external memory 303 is controlled by a memory controller (MC) 309. The external memory 303 is connected as an option and stores font data, an emulation program, form data, and the like. In addition, an operation unit (operation panel) 311 is constituted by a switch for performing operations, an LED display, and the like.

A scanner unit I/F 312 performs correction, processing, and editing on image data received from a scanner unit 313. The scanner unit 313 converts image information into an electrical signal by inputting reflected light obtained by exposure-scanning an image on an original to a CCD. The electrical signal is further converted into a luminance signal made up of the respective colors of R, G, and B, whereby the luminance signal is read as image data. When a user gives the instruction for reading from the operation unit 311 to be started, an original reading instruction is issued to the scanner unit 313. Upon receiving the instruction, the scanner unit 313 performs a reading operation of the original. Possible methods of reading the original include an automatic feeding method in which an original is set in an original feeder (not shown). Another adoptable method involves placing an original on a glass surface, not shown, and moving an exposure unit in order to read the original.

Figure 2:
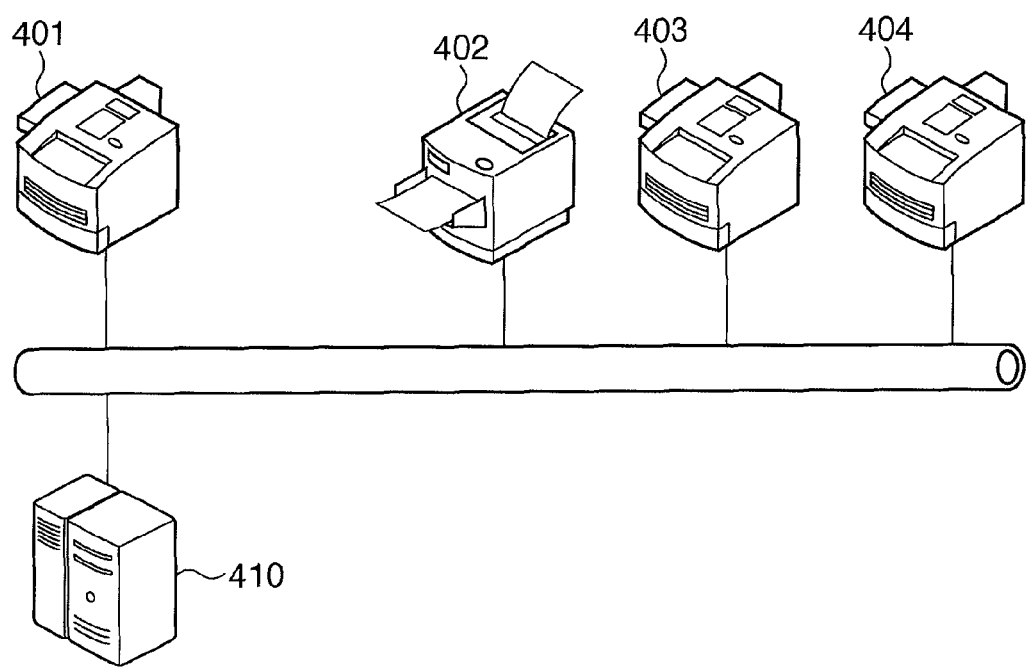
FIG. 2 is a network configuration diagram according to the present embodiment.

FIG. 2 is a network configuration diagram showing an example of an image processing system according to the present embodiment.

Reference numerals 401, 402, 403, and 404 respectively denote image processing apparatuses. In addition, reference numeral 410 denotes a virtual device configuration management server that manages configuration information of a virtual device configured by combining functions of reference numerals 401 to 404. The virtual device configuration management server 410 may take the form of a PC, or the image processing apparatuses may be provided with the functions of the virtual device configuration management server 410.

(Module Configuration Example of Virtual Device Configuration Management Server 410)

FIG. 3 is a module configuration diagram of a server according to the present embodiment. The virtual device configuration management server 410 includes a communication unit 501, a determination unit 502, and a device configuration storage unit 503. Upon receiving a request of job cancel processing order, the communication unit 501 returns a job cancel processing order corresponding to the request of job cancel processing order. Moreover, a processing priority storage unit 505 shown in FIG. 3 is a component to be used in a second embodiment to be described later. In addition, a setting unit 504 shown in FIG. 3 is a component to be used in a fourth embodiment to be described later.

(Module Configuration Example of the Image Processing Apparatuses 401 to 404)

FIG. 4 is a module configuration diagram of an image processing apparatus according to the present embodiment. Image processing apparatuses 401 to 404 include a communication unit 601, a determination unit 602, a cancel instruction unit 603, an image processing unit 604, an ID reference unit 605, and a cancel instruction management unit 606. Upon receiving a job cancel instruction, the communication unit 601 references the ID reference unit 605 for an ID of a job for which a cancel instruction has been issued. If the relevant job is currently being processed in the image processing apparatuses 401 to 404, cancellation of the job is instructed to the image processing unit 604 via the cancel instruction unit 603.

(Example of Virtual Device Configuration Data)

FIG. 5 shows virtual device configuration data according to the present embodiment.

Virtual device configuration data 701 is stored in the device configuration storage unit 503 of the virtual device configuration management server 410 and respectively stores a virtual device ID 701a and actual devices that execute respective functions 701b.

(Example of Virtual Device Configuration Record)

FIG. 6 shows a virtual device configuration record according to the present embodiment.

A virtual device configuration record 702 is generated by the virtual device configuration management server 410 from the virtual device configuration data 701, and stores, for each function 702a of a specific virtual device, an actual device 702b that executes the function. FIG. 6 shows an example of a virtual device 2 shown in FIG. 5.

(Example of Cancel Processing Order Data)

FIG. 7 shows cancel processing order data according to the present embodiment.

Cancel processing order data 703 is data generated by the virtual device configuration management server 410 to be returned to an image processing apparatus, and stores a processing order of a cancel instruction when transmitting the cancel instruction to a specific virtual device.

(Example of Virtual Job)

FIG. 8 shows a virtual job for a job to a virtual device instructed from an image processing apparatus according to the present embodiment.

A virtual job 704 includes a virtual job ID 704a that identifies a virtual job, an actual device 704b that processes the virtual job, and the job itself 704c to be processed.

(Example of Cancel Instruction)

FIG. 9 shows a cancel instruction for canceling a job to a virtual device instructed from an image processing apparatus according to the present embodiment.

A cancel instruction 705 includes a virtual job ID 705a, a cancel processing order 705b, and data 705c indicating that the instruction is a cancel instruction.

(Example of Cancel Operation Screen)

Figure 10:
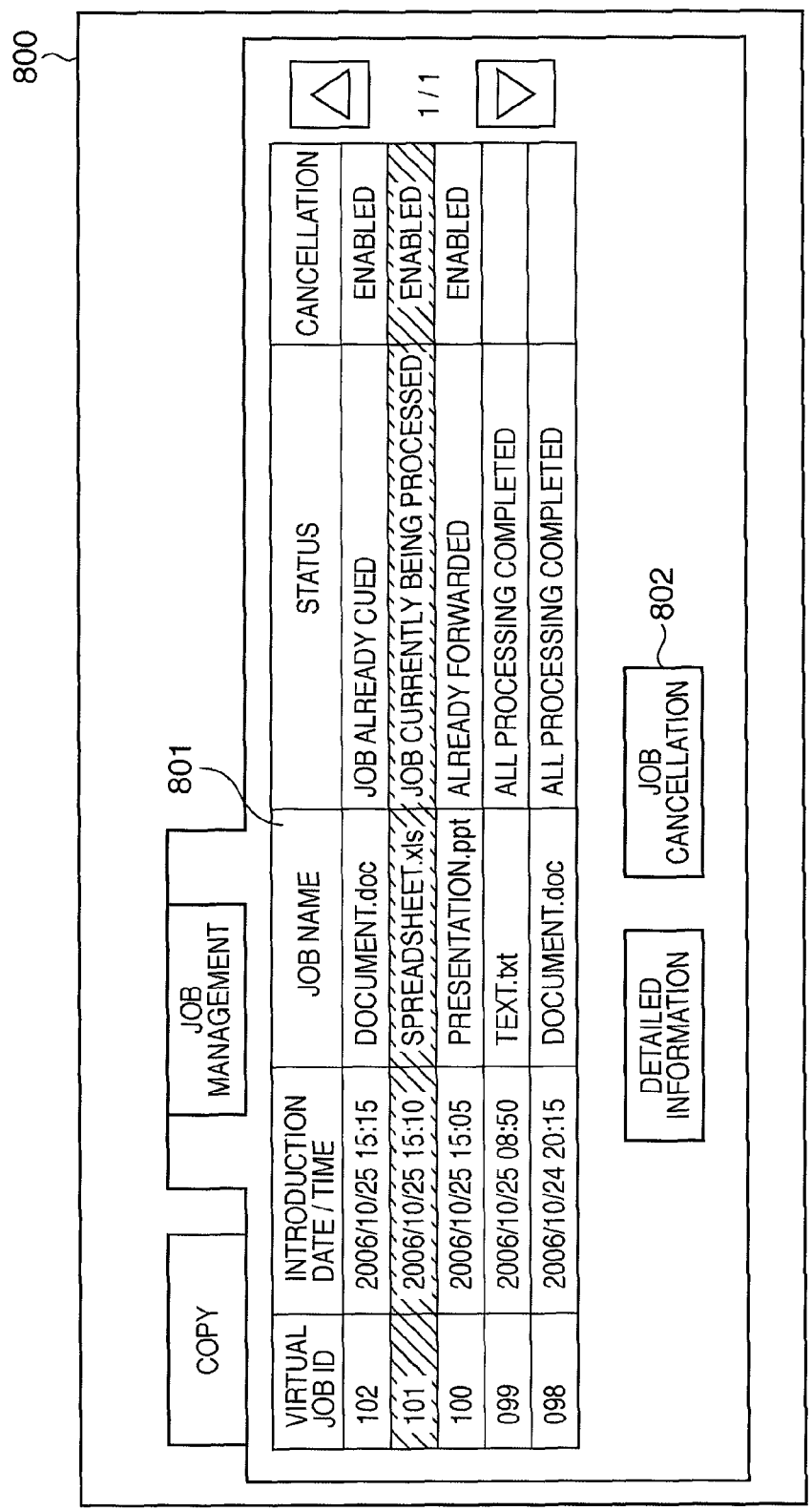
FIG. 10 is a diagram showing an example of a cancel operation screen according to the present embodiment.

FIG. 10 shows a cancel operation screen to be displayed on image processing apparatuses 401 to 404 according to the present embodiment.

A cancel operation screen 800 is constituted by a job list 801 and a job cancel button 802. When a user selects a specific job from the job list 801 and presses down the job cancel button 802, cancel processing of the job commences. In FIG. 10, a job whose status is "all processing completed" is a job in which all virtual job-related processing has been completed. When an indication that all processing has been completed is received from the self apparatus or from the outside, the virtual job is desirably displayed so as not to accept a cancel instruction. The reception of the indication that all processing has been completed from the self apparatus or from the outside corresponds to a second reception.

<Example of Cancel Processing According to the First Embodiment>

(Example of Processing Procedure of Image Processing Apparatus During Cancel Operation)

Figure 11:
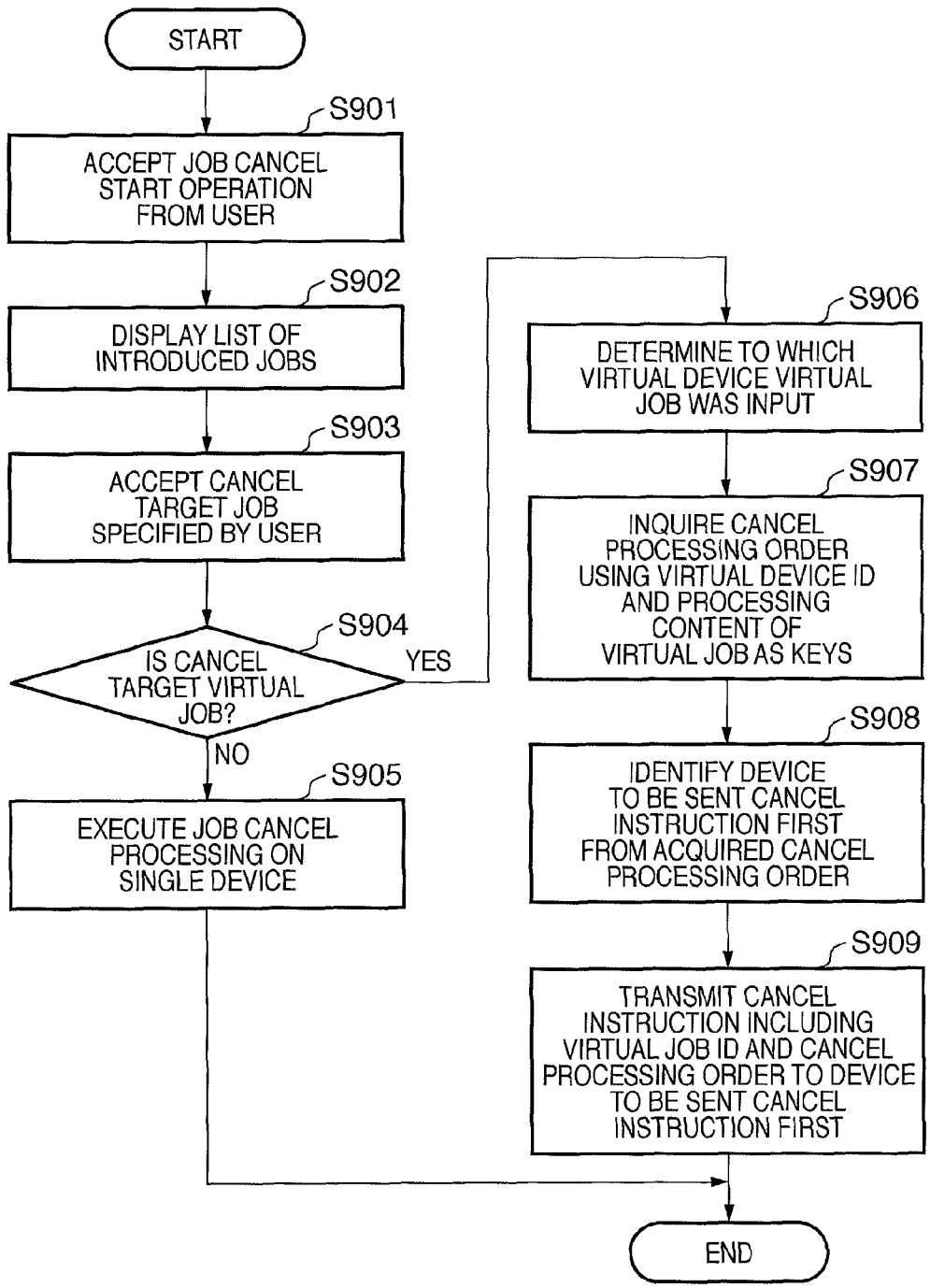
FIG. 11 is a flowchart showing an example of a processing procedure of an image processing apparatus subjected to a cancel operation according to a first embodiment.

FIG. 11 is a flowchart showing an example of a processing procedure of an image processing apparatus subjected to a cancel operation according to a first embodiment. Processing in accordance with the present flowchart is executed by the CPU 201 provided at the computer 100 of the image processing apparatus.

First, in step S901, the image processing apparatus accepts a job cancel start operation from a user. In step S902, the image processing apparatus controls display of the cancel operation screen 800 and awaits a job cancel operation from the user. In step S903, the image processing apparatus accepts a cancel target job ID specified by the user on the cancel operation screen 800. The reception of the cancel target job ID specified by the user corresponds to a first reception.

In step S904, the image processing apparatus determines whether or not the target job specified by the user in step S903 is a virtual job to be processed by a virtual device. The determination of whether or not the target job is a virtual job corresponds to a first determination. As a result of the determination, if the target job is not a virtual job, the flow transits to step S905. If the target job is a virtual job, the flow transits to step S906.

If not a virtual job, in step S905, the cancel instruction unit 603 of the image processing apparatus transmits a cancel instruction of the target job to the image processing unit 604 of the image processing apparatus and terminates the flow. The transmission of the cancel instruction for the target job corresponds to a second transmission.

If the target job is a virtual job, in step S906, the image processing apparatus determines a virtual device ID to which a cancel target job specified by the user had been input in step S903. In step S907, the image processing apparatus transmits a request of cancel processing order to the virtual device configuration management server 410 using the virtual device ID determined in step S906 and processing content of the virtual job as keys. In step S908, the image processing apparatus receives a cancel processing order transmitted from the virtual device configuration management server 410 in response to the request made in step S907, and identifies a destination to which a cancel instruction is to be transmitted first. In step S909, the image processing apparatus transmits the cancel instruction 705 including the virtual job ID and the cancel processing order to the destination identified in step S908. The transmission of the cancel instruction 705 corresponds to a first transmission.

In the present embodiment, a cancel start operation is received from the user when issuing a cancel instruction in steps S901 to S903. At this point, a mode may be adopted in which processing is performed so as to receive an instruction to display a list of input jobs from the user, display a job list, and subsequently stand by until receiving a cancel instruction. In this case, since it is unclear as to whether or not the user will perform cancellation, processing may be performed such as terminating a stand-by state after a lapse of a certain period of time following list display.

(Example of Processing Procedure of Virtual Device Configuration Management Server after Receiving Cancel Request)

Figure 12:
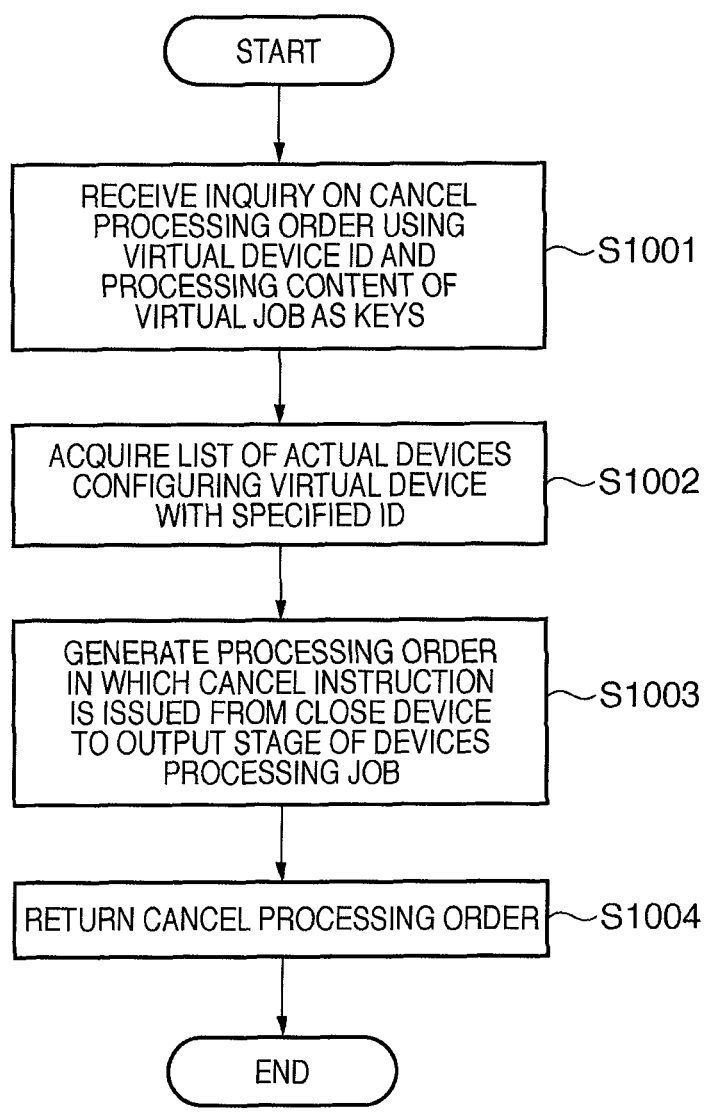
FIG. 12 is a flowchart showing an example of a processing procedure of a virtual device configuration management server having received a request of cancel processing order according to the first embodiment.

FIG. 12 is a flowchart showing an example of a processing procedure of the virtual device configuration management server having received a request of cancel processing order according to the first embodiment. Processing in accordance with the present flowchart is executed by a CPU, not shown, of the virtual device configuration management server 410. Hereinafter, the virtual device configuration management server 410 shall be referred to as server for short whenever so identifiable.

First, in step S1001, the communication unit 501 of the server receives a request of cancel processing order transmitted from an image processing apparatus which uses a virtual device ID and processing content of a virtual job as keys.

In step S1002, the determination unit 502 of the server determines an ID of a specified virtual device, and acquires a virtual device configuration record 702 from the device configuration storage unit 503.

In step S1003, the determination unit 502 of the server arranges image processing apparatuses described in the virtual device configuration record 702 acquired in step S1002 in an order from device close to an output stage, and generates cancel processing order data 703. A descending order of proximity from an output stage is, for example, an order beginning at an image processing apparatus that performs a printing function and ending at an image processing apparatus that performs a scanning function. In addition, examples of output stages include box storage, transmission and output of image data to the outside by electronic mail or fax, or the like. In this manner, a processing order is decided so that the last output stage is cancelled first.

In step S1004, the communication unit 501 of the server transmits the cancel processing order data 703 to the image processing apparatus that is the request source of the cancel processing order.

(Example of Processing Procedure of Image Processing Apparatus after Receiving Cancel Instruction)

Figure 13:
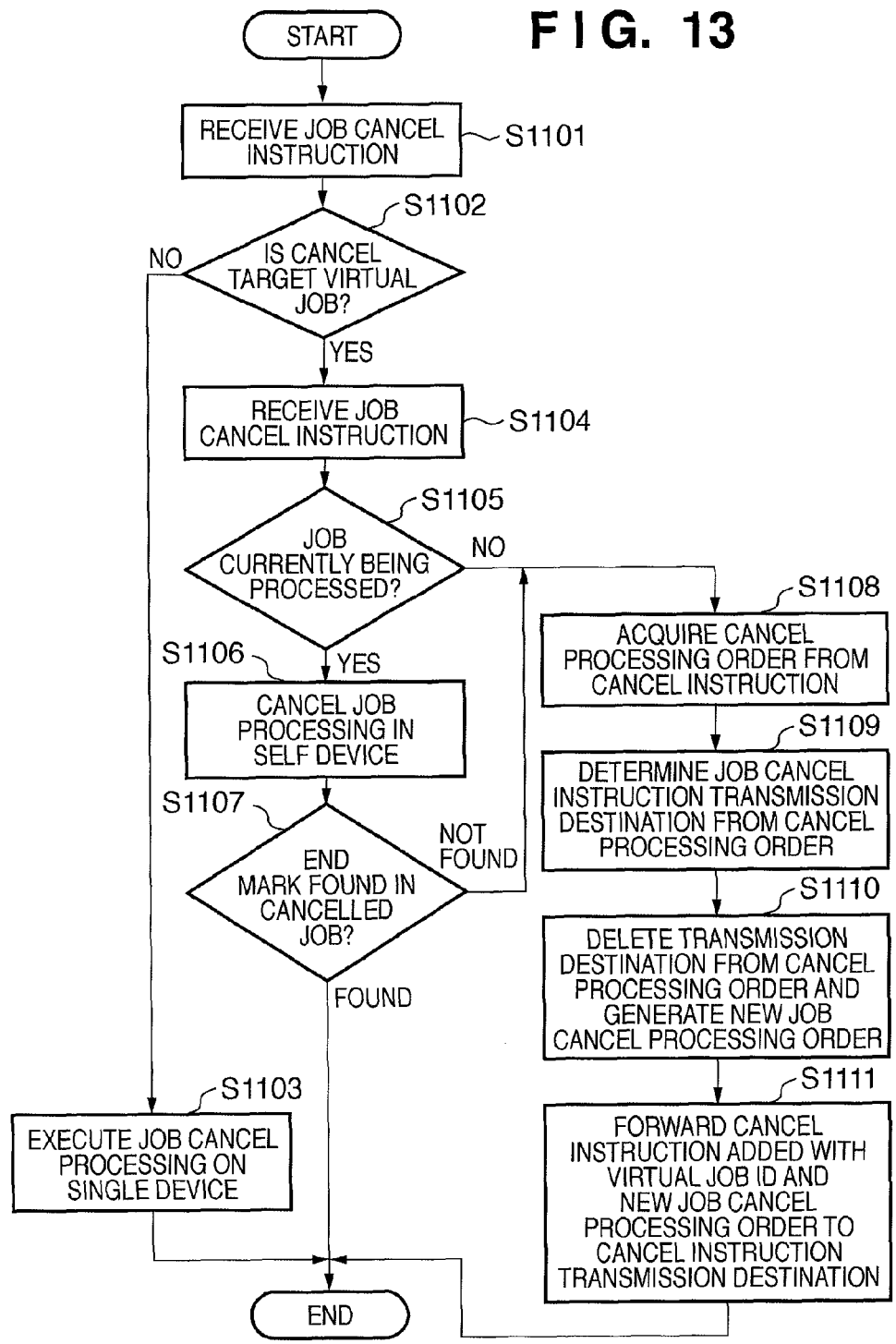
FIG. 13 is a flowchart showing an example of a processing procedure of an image processing apparatus having received a cancel instruction according to the first embodiment.

FIG. 13 is a flowchart showing an example of a processing procedure of an image processing apparatus having received the cancel instruction 705 according to the first embodiment. Processing in accordance with the present flowchart is executed by the CPU 201 provided at the computer 100 of the image processing apparatus.

First, in step S1101, the communication unit 601 of the image processing apparatus receives the cancel instruction 705. In step S1102, the determination unit 602 of the image processing apparatus determines whether or not the job as a target of the cancel instruction 705 is a virtual job to be processed by a virtual device. The determination of whether or not the target job is a virtual job to be processed by a virtual device corresponds to a second determination. As a result of the determination, if the cancel target is not a virtual job, the flow transits to step S1103. If the cancel target is a virtual job, the flow transits to step S1104.

In the case the cancel target is not a virtual job, in step S1103, the cancel instruction unit 603 of the image processing apparatus acquires a job ID included in the cancel instruction 705 from the ID reference unit 605, gives the instruction for cancellation of the job to the image processing unit 604, and terminates the flow.

In the case the cancel target is a virtual job, in step S1104, the determination unit 602 of the image processing apparatus accepts the cancel instruction 705. In step S1105, the determination unit 602 of the image processing apparatus determines whether or not the job as a target of the cancel instruction 705 is currently being processed in the image processing apparatus. The determination of whether or not the target job is currently being processed in the image processing apparatus corresponds to a third determination. As a result of the determination, if the target job is currently being processed, the flow transits to step S1106. If the target job is not being processed, the flow transits to step S1108.

In the case the job is currently being processed, in step S1106, the cancel instruction unit 603 of the image processing apparatus acquires a job ID included in the cancel instruction 705 from the ID reference unit 605, and gives the instruction for cancellation of the job to the image processing unit 604. Subsequently, in step S1107, the determination unit 602 of the image processing apparatus determines whether or not an end mark indicating an end of the job was included in the cancelled job. The determination of whether or not an end mark indicating an end of the job was included in the cancelled job corresponds to a fourth determination. As a result of the determination, if an end mark had been included, cancellation of the virtual job is determined to be completed and the flow is terminated. If an end mark was not included, a virtual job is determined to remain and the flow transits to step S1108.

In the case where the job is not being processed, in step S1108, the cancel instruction management unit 606 of the image processing apparatus acquires a cancel processing order from the cancel instruction 705. In step S1109, the cancel instruction management unit 606 of the image processing apparatus decides an image processing apparatus that is a destination to which a cancel instruction is to be transmitted next. In step S1110, the cancel instruction management unit 606 of the image processing apparatus deletes the image processing apparatus that is the destination to which a cancel instruction is to be transmitted next from the cancel processing order, and generates a new cancel processing order. In step S1111, the cancel instruction management unit 606 of the image processing apparatus generates a new cancel instruction 705 from the virtual job ID and the new cancel processing order. The newly generated cancel instruction 705 is transmitted to the next image processing apparatus via the communication unit 601, and the flow is terminated. The transmission of the newly generated cancel instruction 705 to the next image processing apparatus corresponds to a third transmission.

<Specific Example of Virtual Job Cancellation According to First Embodiment>

Figure 14:
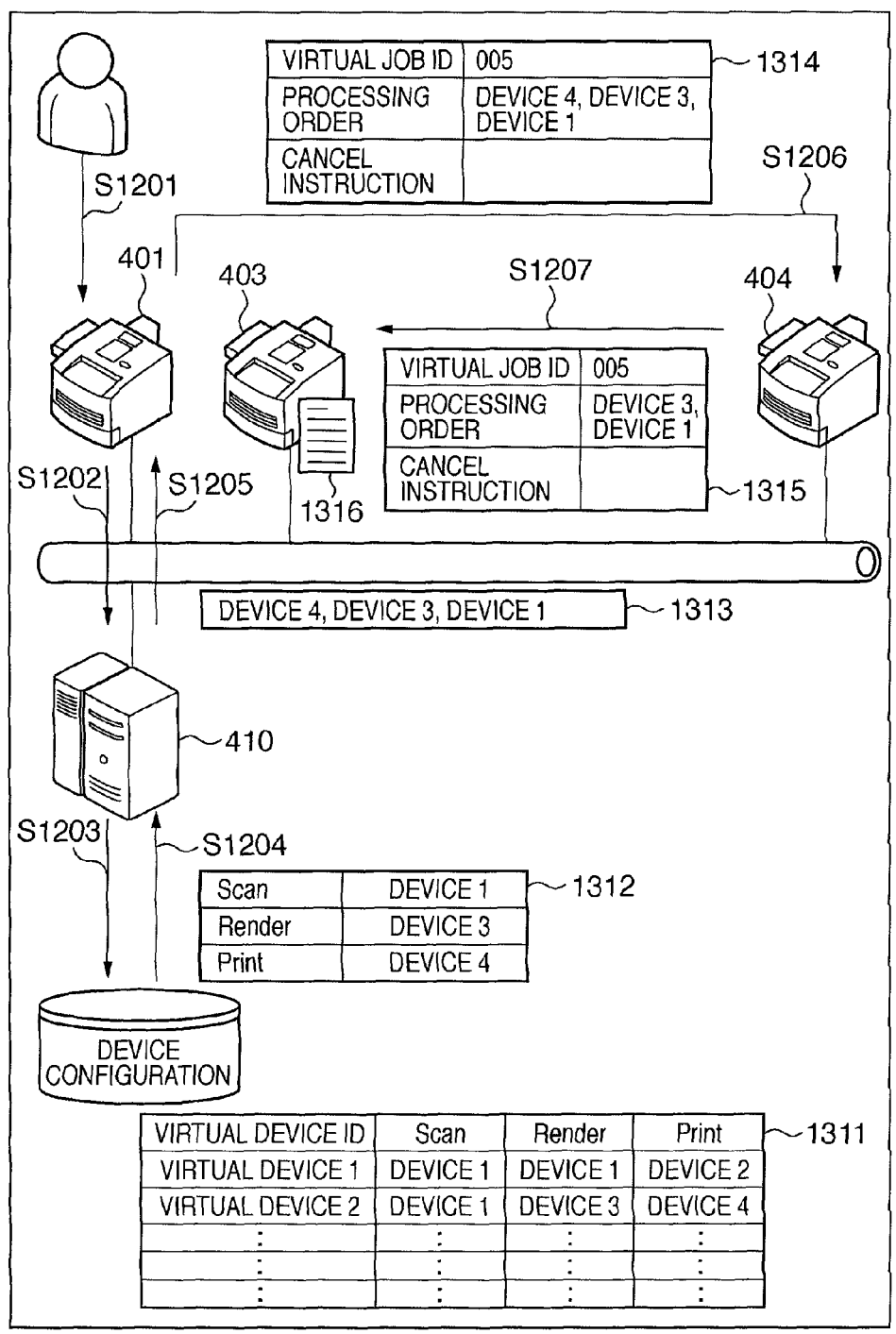
FIG. 14 is a diagram showing a specific example of a virtual job cancellation according to the first embodiment.

FIG. 14 is a specific example of a virtual job cancellation according to the first embodiment.

When the user performs a job cancel operation (S1201) at the image processing apparatus 401, the image processing apparatus 401 transmits a request of cancel processing order to the virtual device configuration management server 410 (S1202).

In accordance with the request from the image processing apparatus 401, the virtual device configuration management server 410 requests a configuration of a relevant virtual device from virtual device configuration data 1311 (S1203), and acquires a virtual device configuration record 1312 (S1204).

The virtual device configuration management server 410 arranges image processing apparatuses described in the acquired virtual device configuration record 1312 in a descending order of proximity from an output stage with respect to processing performed by the image processing apparatuses. Subsequently, cancel processing order data 1313 is generated and returned to the image processing apparatus 401 (S1205).

The image processing apparatus 401 generates a cancel instruction 1314 from the cancel processing order 1313 and transmits the same to the image processing apparatus 404, which is the device 4 that is first in the processing order (S1206).

Upon receiving the cancel instruction 1314, since the virtual job ID included in the cancel instruction 1314 is not currently being processed, the image processing apparatus 404 re-creates a cancel processing order (the device 4 that is first in the cancel processing order is deleted therefrom). Subsequently, the re-created cancel processing order is transmitted as a cancel instruction 1315 to the image processing apparatus 403 that is the device 3, now first in the processing order (S1207).

Since a virtual job 1316 corresponding to the virtual job ID included in the cancel instruction 1315 is currently being processed by the image processing apparatus 403, the job is cancelled.

Processing of a job cancellation to a virtual device instructed by the image processing apparatus 401 is hereby concluded.

<Example of Cancel Processing According to Second Embodiment>

(Example of Cancel Priority Data)

FIG. 15 shows cancel priority data for each virtual device function according to a second embodiment. In the present embodiment, an order of cancel instructions is decided based on an order of precedence in accordance with the cancel priority data.

In cancel priority data 1401, a priority 1401b is set in correspondence with each function 1401a to a value that is greater when the priority to give the instruction for a job cancellation is higher. For example, a higher cancel instruction priority is set to an image processing apparatus performing a printing function with a value of "100" as compared to an image processing apparatus performing a scanning function with a value of "10". The cancel priority data 1401 is stored in the processing priority storage unit 505 (refer to FIG. 3) of the virtual device configuration management server 410.

(Example of Processing Procedure of Virtual Device Configuration Management Server Generating Cancel Processing Order)

FIG. 16 is a flowchart showing a virtual device configuration management server that generates a cancel processing order according to the second embodiment.

In the present example, an order of precedence is decided while also taking cancel processing priority into consideration. Processing in accordance with the present flowchart is executed by a CPU, not shown, of the virtual device configuration management server 410. Hereinafter, the virtual device configuration management server 410 shall be referred to as server for short whenever so identifiable.

First, in step S1501, the communication unit 501 of the server receives a request of cancel processing order transmitted from an image processing apparatus which uses a virtual device ID and processing content of a virtual job as keys. In step S1502, the determination unit 502 of the server determines an ID of a specified virtual device, and acquires a virtual device configuration record 702 from the device configuration storage unit 503. In step S1503, the determination unit 502 of the server acquires a cancel processing priority for each function from the processing priority storage unit 505.

In step S1504, the determination unit 502 of the server rearranges image processing apparatuses described in the virtual device configuration record 702 acquired in step S1502, and generates the cancel processing order data 703. Rearranging is performed, for each function to be executed, in a descending order of the cancel processing priorities acquired in step S1503.

In step S1505 the communication unit 501 of the server transmits the cancel processing order data 703 to the image processing apparatus that is the request source of the cancel processing order.

<Specific Example of Virtual Job Cancellation According to Second Embodiment>

Figure 17:
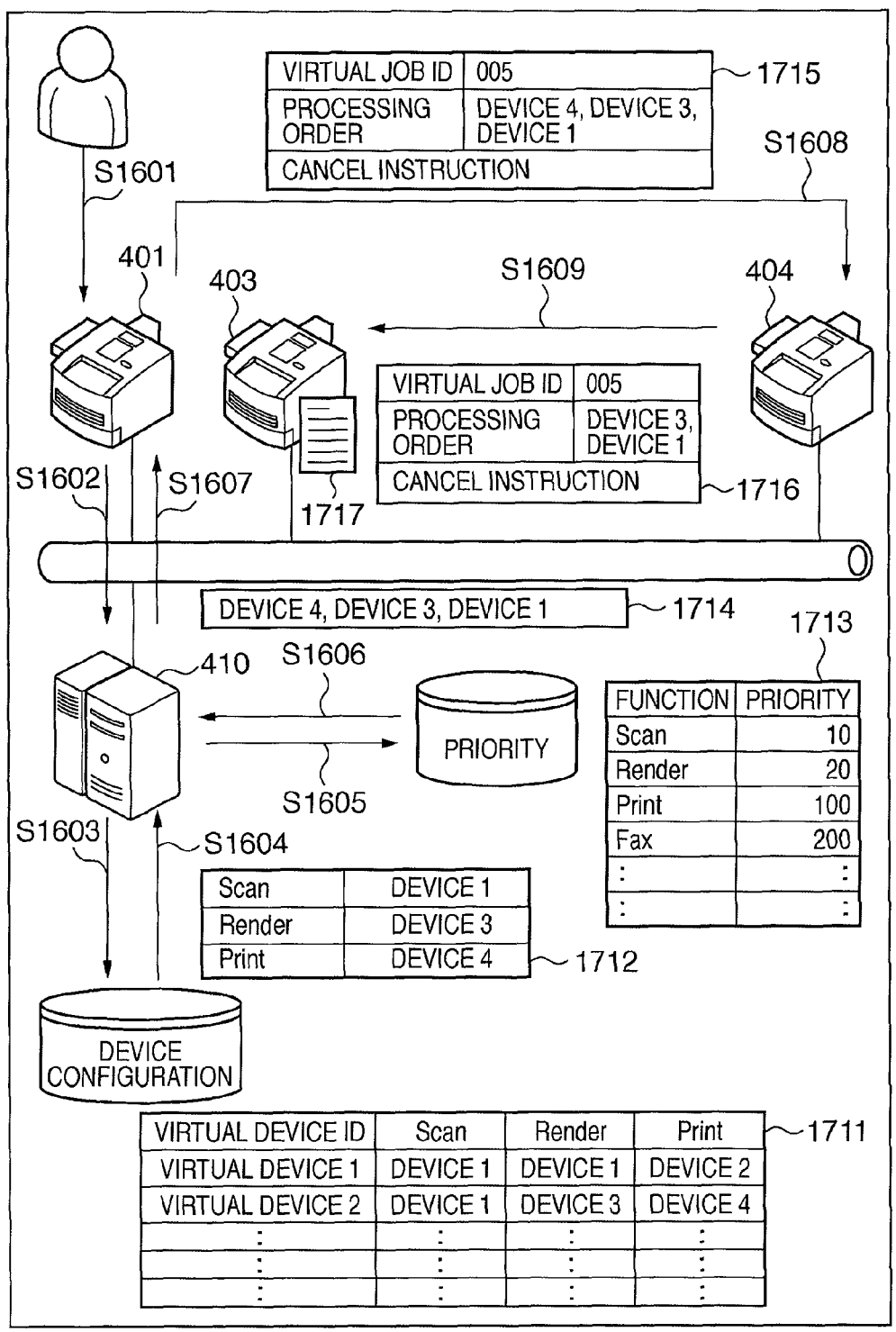
FIG. 17 is a diagram showing a specific example of a virtual job cancellation according to the second embodiment.

FIG. 17 is a specific example of a virtual job cancellation according to the second embodiment.

When the user performs a job cancel operation (S1601) at the image processing apparatus 401, the image processing apparatus 401 transmits a request of cancel processing order to the virtual device configuration management server 410 (S1602).

In accordance with the request from the image processing apparatus 401, the virtual device configuration management server 410 requests a configuration of a relevant virtual device from virtual device configuration data 1711 (S1603), and acquires a virtual device configuration record 1712 (S1604). In addition, the virtual device configuration management server 410 requests a cancel processing priority 1713 (S1605), and acquires the cancel processing priority 1713 (S1606).

The virtual device configuration management server 410 arranges image processing apparatuses described in the virtual device configuration record 1312 acquired in step S1604 in a descending order of cancel processing priorities 1713 acquired in step S1606, generates cancel processing order data 1714, and returns the same to the image processing apparatus 401 (S1607).

The image processing apparatus 401 generates a cancel instruction 1715 from the cancel processing order 1714 and transmits the same to the image processing apparatus 404, which is the device 4 having the highest priority (S1608). Note that the priorities in the present example are consistent with the order from an output stage according to the first embodiment and is therefore coincidentally the same processing order as shown in FIG. 14.

Upon receiving the cancel instruction 1715, since the virtual job ID included in the cancel instruction 1715 is not currently being processed, the image processing apparatus 404 re-creates a cancel processing order (the device 4 is deleted from the cancel processing order). The re-created cancel processing order is transmitted as a cancel instruction 1716 to the image processing apparatus 403 that is the device 3 now having the highest priority (S1609).

Since a virtual job 1717 corresponding to the virtual job ID included in the cancel instruction 1716 is currently being processed by the image processing apparatus 403, the job is cancelled. Processing of a job cancellation to a virtual device instructed by the image processing apparatus 401 is hereby concluded.

<Example of Cancel Processing According to Third Embodiment>

(Example of Cancel Preparation Instruction)

FIG. 18 shows a cancel preparation instruction for giving the instruction, in advance, for preparation for job cancellation upon introducing a virtual job according to a third embodiment.

A cancel preparation instruction 1801 includes a virtual job ID 1801a and a cancel processing order 1801b. When a job cancel operation is performed by the user, the image processing apparatus having the cancel preparation instruction 1801 retrieves the cancel preparation instruction 1801 consistent with the virtual job ID 1801a specified by the user, and creates and transmits a cancel instruction according to the cancel processing order 1801b included in the cancel preparation instruction 1801.

(Example of Processing Procedure of Image Processing Apparatus Generating Cancel Preparation Instruction)

FIG. 19 is a flowchart of an image processing apparatus generating a cancel preparation instruction upon issuing a job according to the third embodiment. Processing in accordance with the present flowchart is executed by the CPU 201 provided at the computer 100 of the image processing apparatus.

First, in step S1901, the image processing apparatus acquires a virtual job ID of the issued virtual job. In step S1902, the image processing apparatus acquires processing content of the issued virtual job. In step S1903, the image processing apparatus acquires a virtual device ID of a virtual device to process the virtual job. In step S1904, the image processing apparatus requests a cancel processing order with respect to the virtual device ID to the virtual device configuration management server 410.

In step S1905, the image processing apparatus generates the cancel preparation instruction 1801 from the cancel processing order and the virtual job ID transmitted from the virtual device configuration management server 410. In step S1906, the image processing apparatus transmits the cancel preparation instruction 1801 to each image processing apparatus processing the virtual job. Consequently, a cancel preparation instruction can be transmitted as information related to the virtual job and a notification that the virtual job has been issued can be given to a plurality of image processing apparatuses cooperatively processing the virtual job.

(Example of Processing Procedure of Image Processing Apparatus Subjected to Job Cancel Operation)

Figure 20:
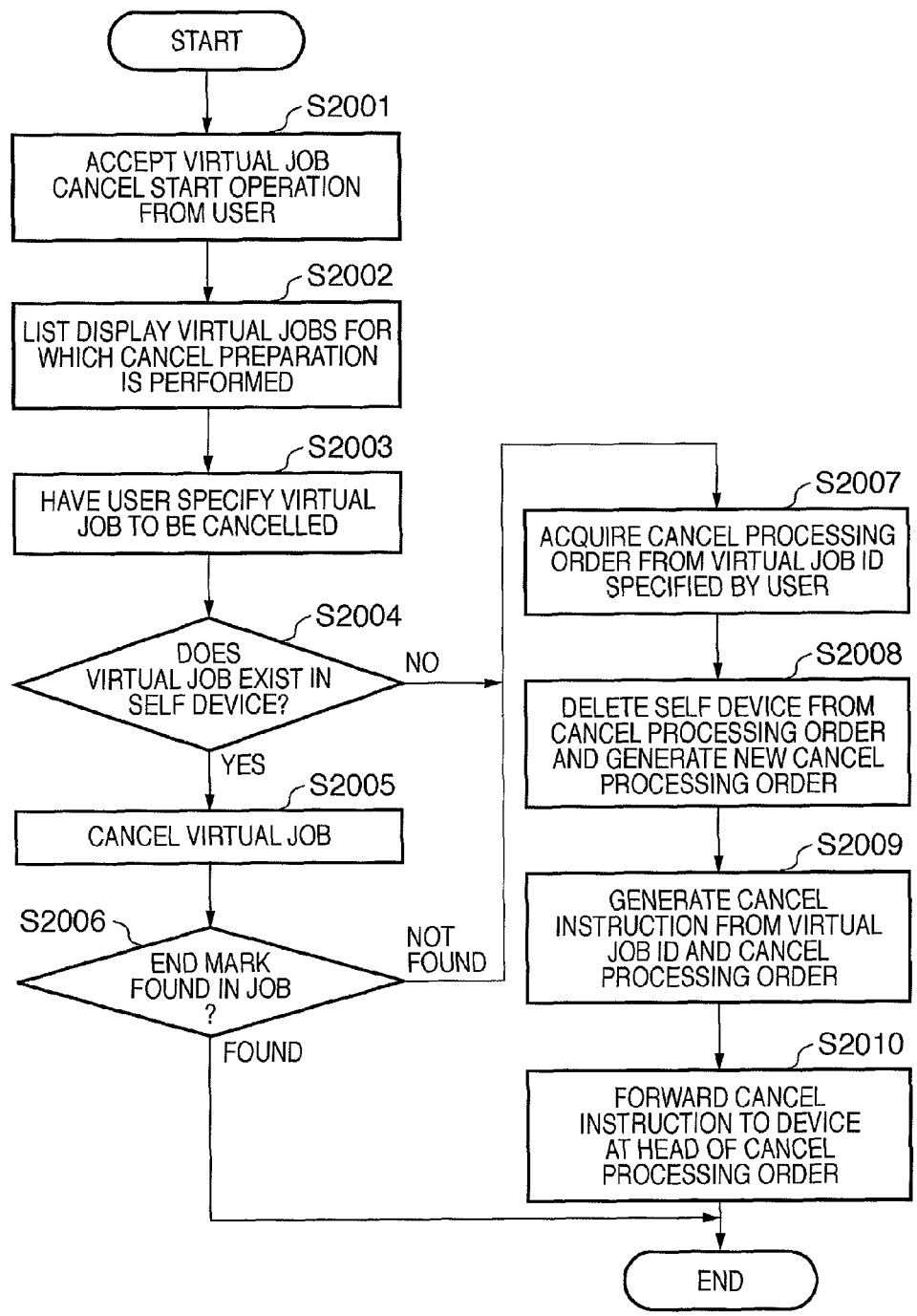
FIG. 20 is a flowchart showing an example of a processing procedure of an image processing apparatus subjected to a job cancel operation by a user according to the third embodiment.

FIG. 20 is a flowchart showing an image processing apparatus subjected to a job cancel operation by a user according to the third embodiment. Processing in accordance with the present flowchart is executed by the CPU 201 provided at the computer 100 of the image processing apparatus.

First, in step S2001, the image processing apparatus accepts a virtual job cancel start operation from a user. In step S2002, the image processing apparatus displays a list of virtual jobs for which cancel preparation is being performed. In step S2003, the image processing apparatus acquires a cancel target job ID specified by the user.

In step S2004, the determination unit 602 of the image processing apparatus determines whether or not the job specified in step S2003 is currently being processed. The determination of whether or not the job specified by the user is currently being processed corresponds to a fifth determination. As a result of the determination, if the target job is currently being processed, the flow transits to step S2005. If the target job is not being processed, the flow transits to step S2007.

In the case the job is currently being processed, in step S2005, the cancel instruction unit 603 of the image processing apparatus acquires a job ID included in the cancel instruction 705 from the ID reference unit 605, and gives the instruction for cancellation of the job to the image processing unit 604. In step S2006, the determination unit 602 of the image processing apparatus determines whether or not an end mark indicating an end of the job was included in the cancelled job. The determination of whether or not an end mark indicating an end of the job was included in the cancelled job corresponds to a sixth determination. As a result of the determination, if an end mark was included, cancellation of the virtual job is assumed to be completed and the flow is terminated. If an end mark was not included, a virtual job is assumed to remain and the flow transits to step S2007.

In a case where the job is not being processed, in step S2007, the cancel instruction management unit 606 of the image processing apparatus searches for and acquires a relevant cancel preparation instruction 1801 corresponding to the cancel target job ID specified by the user in step S2003. In step S2008, the cancel instruction management unit 606 of the image processing apparatus deletes the own image processing apparatus from the cancel processing order, and generates a new cancel processing order. In step S2009, cancel instruction management unit 606 of the image processing apparatus generates a cancel instruction 705 from the virtual job ID and the new cancel processing order. In step S2010, the communication unit 601 of the image processing apparatus transmits the cancel instruction 705 to the image processing apparatus that is first in the cancel processing order and terminates the flow. The transmission of the newly generated cancel instruction 705 to the image processing apparatus that is first in the cancel processing order corresponds to a fourth transmission.

(Job Cancel Operation Screen on Image Processing Apparatus According to Third Embodiment)

Figure 21:
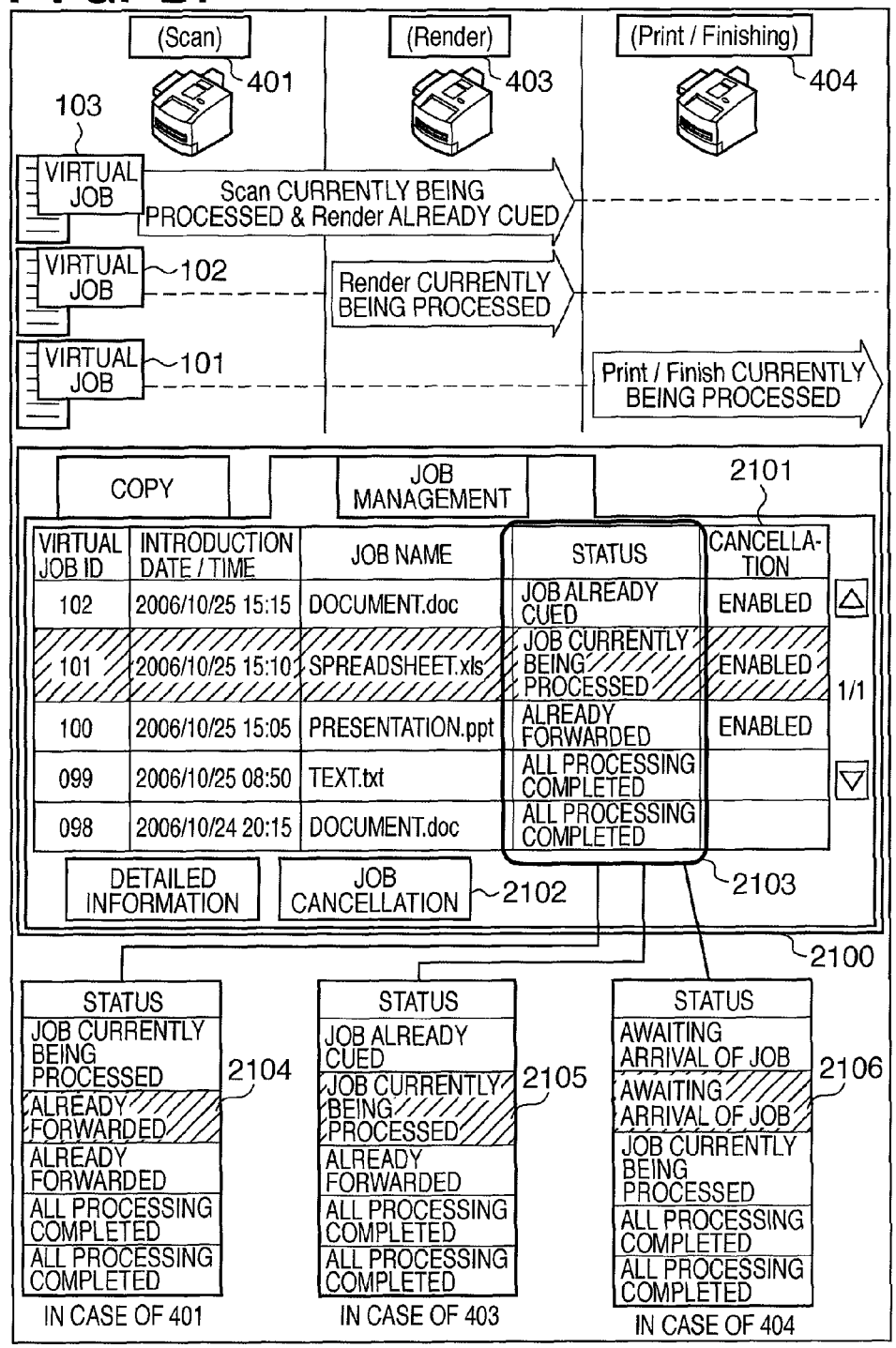
FIG. 21 is a diagram showing an example of a job cancel operation screen on each image processing apparatus on which a user performs a job cancel operation according to the third embodiment.

FIG. 21 shows an example of a job cancel operation screen on each image processing apparatus on which a user performs a job cancel operation according to the third embodiment. In this case, as an example, virtual jobs 101, 102, and 103 are considered, respectively assumed as being processed by the image processing apparatus 404, the image processing apparatus 403, and the image processing apparatuses 401 and 403.

As shown, even for a virtual job not yet input, a state thereof can be displayed. While a list of virtual jobs is displayed in the present embodiment, a list of information on all jobs, together with ordinary jobs to be performed by self apparatuses, may be displayed instead.

Reference numeral 2101 denotes a job cancel operation screen of the image processing apparatuses 401, 403, and 404. Reference numeral 2102 denotes a job cancel button. In accordance with the statuses of the virtual jobs in the respective image processing apparatuses, a status display area 2103 is respectively displayed as reference numerals 2104, 2105, and 2106. The user is to select a job that can be cancelled and issue a cancel instruction. Consequently, a cancel request is issued by the image processing apparatus.

<Specific Example of Virtual Job Cancellation According to Third Embodiment>

Figure 22A:
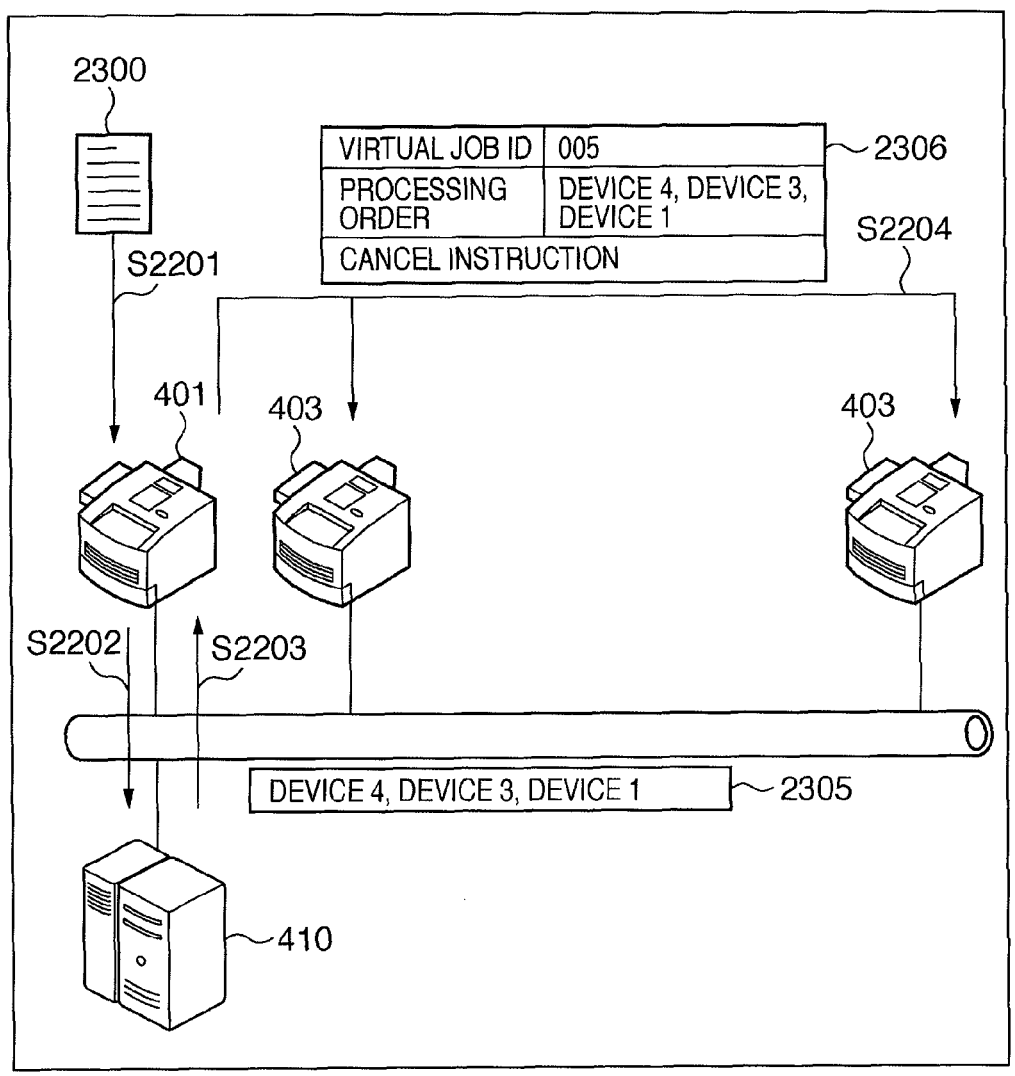
FIG. 22A is a diagram showing a specific example of a cancel preparation instruction of a virtual job according to the third embodiment.
Figure 22B:
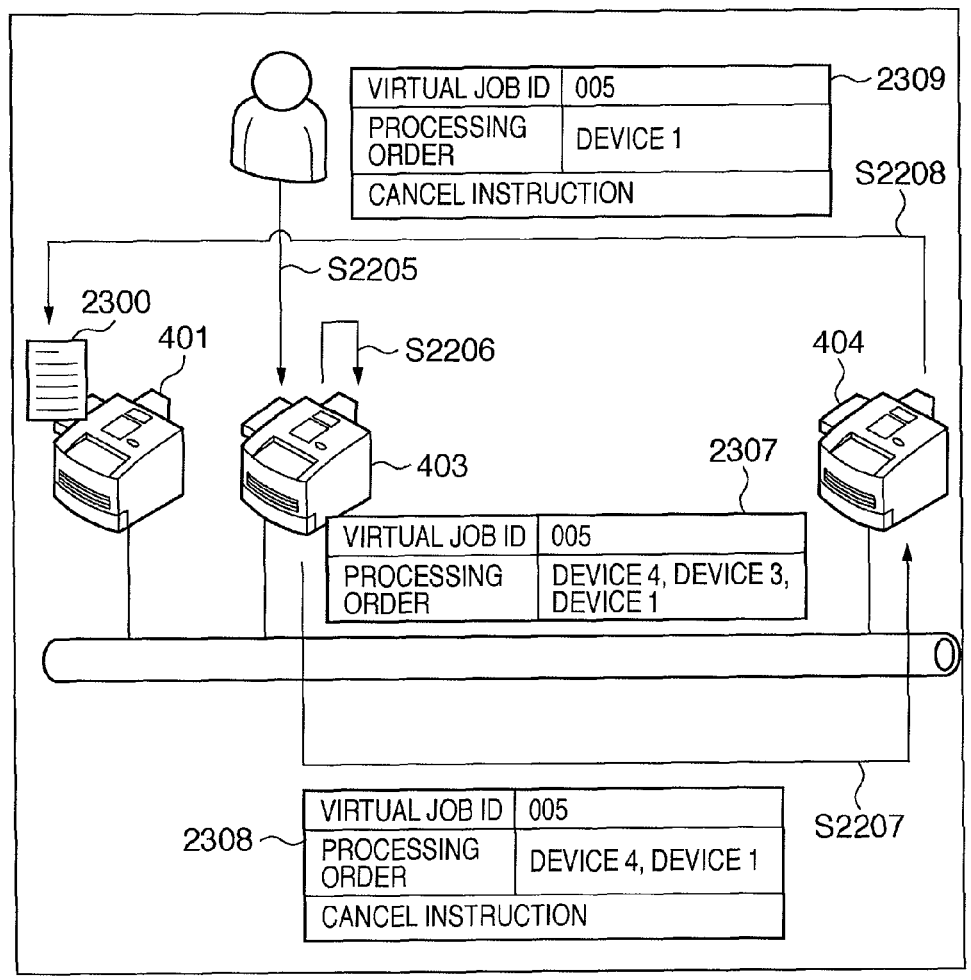
FIG. 22B is a diagram showing a specific example of a cancel instruction of a virtual job according to the third embodiment.

FIGS. 22A and 22B show specific examples of a cancel preparation instruction and a cancel instruction of a virtual job according to the third embodiment.

FIG. 22A shows an example of a cancel preparation instruction.

When a job 2300 with a virtual job ID 005 is input to the image processing apparatus 401 (S2201), the image processing apparatus 401 issues a request of cancel processing order to the virtual device configuration management server 410 (S2202).

The image processing apparatus 401 receives a cancel processing order 2305 (S2203), generates a cancel preparation instruction 2306, and transmits the cancel preparation instruction to the image processing apparatus 403 and the image processing apparatus 404 constituting a virtual device (S2204). The generation of the cancel processing order 2305 may be performed using the method according to the first embodiment or the method according to the second embodiment.

FIG. 22B shows an example of a cancel operation after cancel preparation.

When the user performs a job cancel operation at the image processing apparatus 403 (S2205) after the cancel preparation represented as steps S2201 to S2204 in FIG. 22A, the image processing apparatus 403 determines whether or not the virtual job for which the user had issued a cancel instruction is currently being processed (S2206).

As a result of the determination, since a relevant virtual job is not being processed, the image processing apparatus 403 generates a cancel instruction 2308 from a stored cancel preparation instruction 2307. In this case, the device 3 that is the self apparatus 403 is deleted from the processing order. Subsequently, the image processing apparatus 403 transmits the cancel instruction 2308 to the image processing apparatus 404 that is the device 4, now first in the processing order (S2207).

Since the image processing apparatus 404 is similarly not processing a relevant virtual job, the image processing apparatus 404 deletes the device 4 that is the own image processing apparatus from the cancel processing order of the cancel instruction 2308, newly generates a cancel instruction 2309, and transmits the same to the image processing apparatus 401 (S2208).

Since the image processing apparatus 401 is processing a relevant virtual job 2300, the image processing apparatus 401 performs cancel processing. Processing of a job cancellation to a virtual device instructed by the image processing apparatus 403 is hereby concluded.

<Example of Cancel Processing According to Fourth Embodiment>

In a fourth embodiment, unlike the first to third embodiments where an image processing apparatus having given the instruction for a job cancellation generates the cancel instruction 705, the virtual device configuration management server 410 generates and transmits the cancel instruction 705.

(Example of Processing Procedure of Image Processing Apparatus Subjected to Cancel Operation)

Figure 23:
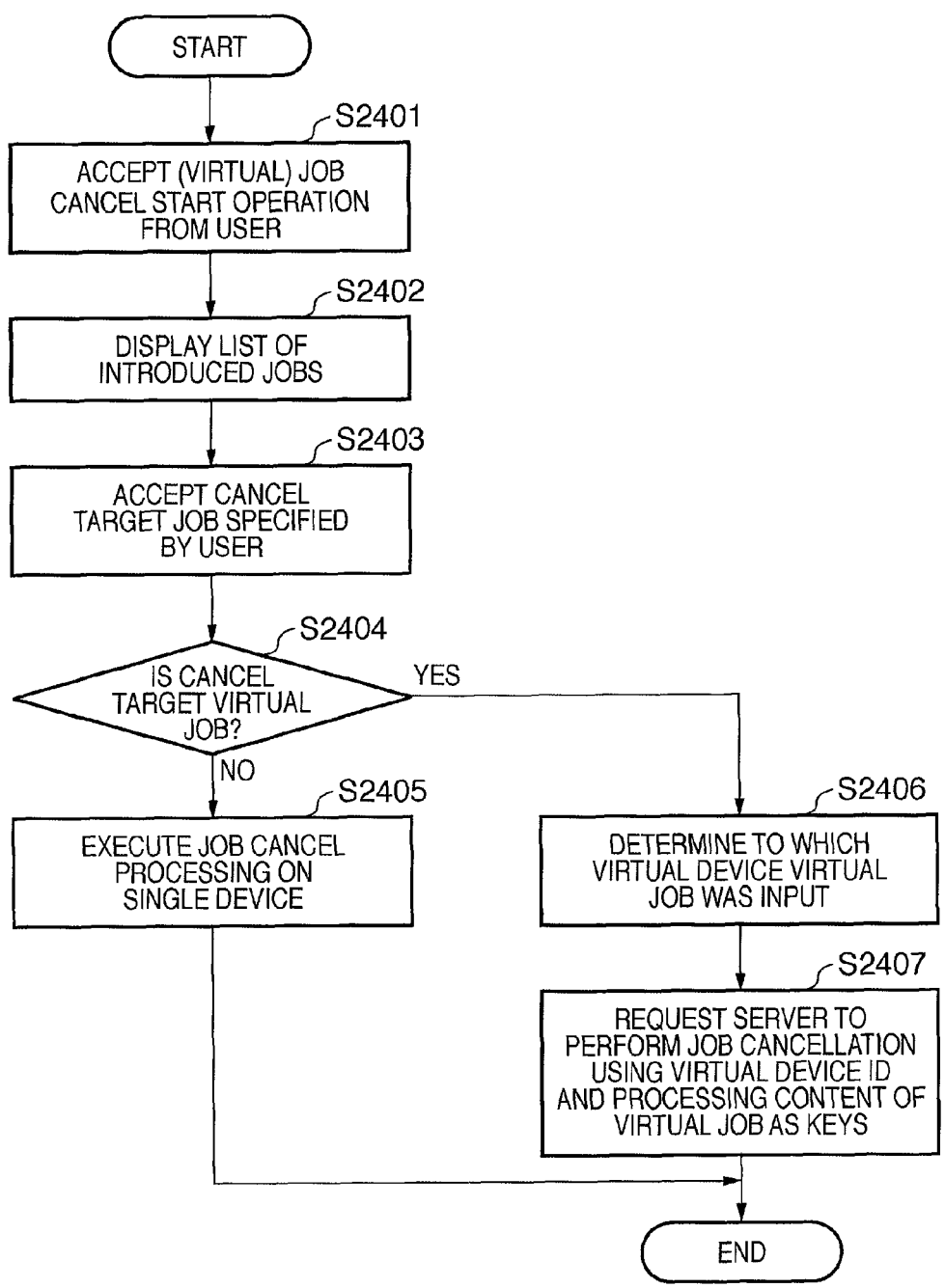
FIG. 23 is a flowchart showing an example of a processing procedure of an image processing apparatus subjected to a cancel operation according to a fourth embodiment.

FIG. 23 is a flowchart of an image processing apparatus subjected to a cancel operation according to the fourth embodiment. Processing in accordance with the present flowchart is executed by the CPU 201 provided at the computer 100 of the image processing apparatus.

First, in step S2401, the image processing apparatus accepts a job cancel start operation from a user. In step S2402, the image processing apparatus displays the cancel operation screen 800 and awaits a job cancel operation from the user. In step S2403, the image processing apparatus accepts a cancel target job ID specified by the user on the cancel operation screen 800.

In step S2404, the image processing apparatus determines whether or not the target job specified by the user in step S2403 is a virtual job to be processed by a virtual device. As a result of the determination, if the target job is not a virtual job, the flow transits to step S2405. If the target job is a virtual job, the flow transits to step S2406.

If not a virtual job, in step S2405, the cancel instruction unit 603 gives the instruction for cancellation of the target job to the image processing unit 604 of the image processing apparatus and terminates the flow.

If the target job is a virtual job, in step S2406, the image processing apparatus determines a virtual device ID to which the cancel target job specified by the user had been input in step S2403. In step S2407, the image processing apparatus transmits a request of cancel instruction to the virtual device configuration management server 410 using the virtual device ID determined in step S2406 and processing content of the virtual job as keys, and terminates the flow.

(Example of Processing Procedure of Virtual Device Configuration Management Server Having Received Cancel Instruction Request)

FIG. 24 is a flowchart of a virtual device configuration management server that has received a request of cancel instruction according to the fourth embodiment. Processing in accordance with the present flowchart is executed by a CPU, not shown, of the virtual device configuration management server 410. Hereinafter, the virtual device configuration management server 410 shall be referred to as server for short whenever so identifiable.

First, in step S2501, the communication unit 501 of the server receives a request of cancel instruction transmitted from an image processing apparatus which uses a virtual device ID and processing content of a virtual job as keys. In step S2502, the determination unit 502 of the server determines an ID of the specified virtual device, and acquires a virtual device configuration record 702 from the device configuration storage unit 503. In step S2503, the determination unit 502 of the server acquires a cancel processing priority for each function from the processing priority storage unit 505.

In step S2504, the determination unit 502 of the server rearranges image processing apparatuses described in the virtual device configuration record 702 acquired in step S2502, and generates cancel processing order data 703. Rearranging is performed, for each function to be executed, in a descending order of the cancel processing priorities acquired in step S2503.

In step S2505, the setting unit 504 of the server generates a cancel instruction 705 including cancel processing order data 703 generated in step S2504. In step S2506, the communication unit 501 of the server transmits the cancel instruction 705 generated in step S2505 to the image processing apparatus to which the cancel instruction is to be transmitted first according to the cancel processing order 703.

While image processing apparatuses have been arranged according to priorities of the processing priority storage unit 505 in the description provided above, other orders enabling cancellations at virtual devices to be performed smoothly may be adopted, such as arranging image processing apparatuses in a descending order of proximity from an output stage as shown in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-267120, filed Oct. 12, 2007, which is hereby incorporated by reference herein in its entirety.

The invention claimed is:

1. An information processing apparatus comprising:
   first reception means adapted to receive a cancel request of a job from a user;
   first determination means adapted to determine whether or not the job as a target for the cancel request received by the reception means is a virtual job processed by cooperating functions of a plurality of image processing apparatuses;
   acquisition means adapted to acquire, in a case where the job is determined to be a virtual job by the first determination means, information regarding the plurality of image processing apparatuses which cooperates to execute the virtual job and an order in which a cancel instruction for the virtual job is to be transmitted to the plurality of image processing apparatuses; and
   first transmission means adapted to transmit the cancel instruction for the virtual job to any of the plurality of the image processing apparatuses based on the order acquired by the acquisition means,
   wherein a priority order for issuing the cancel instruction is set for each processing to be performed by each cooperating image processing apparatus when executing the virtual job, and
   said acquired order in which the cancel instruction for the virtual job is to be transmitted to the plurality of image processing apparatuses is decided based on the set priority order.

2. The information processing apparatus according to claim 1, further comprising second transmission means adapted to transmit the cancel instruction to an image processing apparatus at which the job as a target for the cancel request is currently being processed in a case where the first determination means determines that the job as a target for the cancel request is not a virtual job.

3. The information processing apparatus according to claim 1, further comprising display control means adapted to perform control for displaying, to the user, a list of jobs input to the information processing apparatus itself,
   wherein the job as a target for the cancel request received by the first reception means is a job selected by the user from the list of jobs displayed by the display control means.

4. The image processing apparatus according to claim 3, further comprising second reception means adapted to receive a notification that all processing associated with the virtual job input to the information processing apparatus itself has been completed from the information processing apparatus itself or an outside,
   wherein the display control means is adapted to display the virtual job input to the information processing apparatus itself so that a cancel instruction cannot be performed on the display based on a reception by the second reception means of the notification that all processing associated with the virtual job has been completed.

5. The information processing apparatus according to claim 2, wherein the information processing apparatus is any one of the plurality of image processing apparatuses which cooperates when executing the virtual job, and issues a cancel instruction to the information processing apparatus itself in a case where a transmission target of a cancel instruction by the first transmission means or the second transmission means is the information processing apparatus itself, the information processing apparatus further comprising:
   second determination means adapted to determine whether or not a job as a target for a cancel instruction of the information processing apparatus itself or a cancel instruction transmitted from an external apparatus is the virtual job;
   third determination means adapted to determine, in a case where the job as a target is determined to be the virtual job by the second determination means, whether or not the virtual job is currently being processed by the information processing apparatus itself;
   cancel means adapted to cancel, in a case where the virtual job is determined as being processed by the information processing apparatus itself by the third determination means, the virtual job currently being processed;
   decision means adapted to decide, in a case where the virtual job is determined as not being processed by the information processing apparatus itself by the third determination means, an image processing apparatus to which a cancel instruction is to be transmitted subsequent to the information processing apparatus itself based on the order included in the cancel instruction in which the cancel instruction for the virtual job is to be transmitted to the plurality of image processing apparatuses; and
   third transmission means adapted to transmit the cancel instruction for the virtual job to the image processing apparatus decided by the decision means.

6. An information processing method comprising:
   a first reception step of receiving a cancel request of a job from a user;
   a first determination step of determining whether or not the job as a target for the cancel request received in the reception step is a virtual job processed by cooperating functions of a plurality of image processing apparatuses;
   an acquisition step of acquiring, in a case where the job is determined to be a virtual job in the first determination step, information regarding the plurality of image processing apparatuses to cooperate to execute the virtual job and an order in which a cancel instruction for the virtual job is to be transmitted to the plurality of image processing apparatuses; and
   a first transmission step of transmitting the cancel instruction for the virtual job to any of the plurality of the image processing apparatuses based on the order acquired in the acquisition step,
   wherein a priority order for issuing the cancel instruction is set for each processing to be performed by each cooperating image processing apparatus when executing the virtual job, and
   said acquired order in which the cancel instruction for the virtual job is to be transmitted to the plurality of image processing apparatuses is decided based on the set priority order.

7. The information processing method according to claim 6, further comprising a second transmission step of transmitting the cancel instruction to an image processing apparatus at which the job as a target for the cancel request is currently being processed in a case where it is determined in the first determination step that the job as a target for the cancel request is not a virtual job.

8. The information processing method according to claim 6, further comprising a display control step of performing control for displaying, to the user, a list of jobs input to the information processing apparatus itself,
wherein the job as a target for the cancel request received in the first reception step is a job selected by the user from the list of jobs displayed by the display control means.

9. The image processing method according to claim 8, further comprising a second reception step of receiving a notification that all processing associated with the virtual job input to the information processing apparatus itself has been completed from the information processing apparatus itself or an outside,
wherein in the display control step, the virtual job input to the information processing apparatus itself is displayed so that a cancel instruction cannot be performed on the display based on a reception in the second reception step of the notification that all processing associated with the virtual job has been completed.

10. The information processing method according to claim 7, wherein the information processing apparatus is any one of the plurality of image processing apparatuses which cooperates when executing the virtual job, and issues a cancel instruction to the information processing apparatus itself in a case where a transmission target of a cancel instruction in the first transmission step or the second transmission step is the information processing apparatus itself, the information processing method comprising:
a second determination step of determining whether or not a job as a target for a cancel instruction of the information processing apparatus itself or a cancel instruction transmitted from an external apparatus is the virtual job;
a third determination step of determining, in a case where the job as a target is determined to be the virtual job in the second determination step, whether or not the virtual job is currently being processed by the information processing apparatus itself;
a cancel step of canceling, in a case where the virtual job is determined as being processed by the information processing apparatus itself in the third determination step, the virtual job currently being processed;
a decision step of deciding, in a case where the virtual job is determined as not being processed by the information processing apparatus itself in the third determination step, an image processing apparatus to which a cancel instruction is to be transmitted subsequent to the information processing apparatus itself based on the order included in the cancel instruction in which the cancel instruction for the virtual job is to be transmitted to the plurality of image processing apparatuses; and
a third transmission step of transmitting the cancel instruction for the virtual job to the image processing apparatus decided in the decision step.

11. A non-transitory computer-readable storage medium which stores a computer-executable program for causing a computer to execute the steps of the information processing method according to claim 6.

12. An image processing apparatus comprising:
reception means adapted to receive a cancel instruction for canceling a job;
second determination means adapted to determine whether or not the job as a target for the cancel instruction received by the reception means is a virtual job to be executed by cooperating functions of a plurality of image processing apparatuses;
third determination means adapted to determine, in a case where the job as a target for the cancel instruction is determined to be a virtual job by the second determination means, whether or not the virtual job is currently being processed by the information processing apparatus itself;
cancel means adapted to cancel, in a case where the virtual job is determined as being processed by the information processing apparatus itself by the third determination means, the virtual job currently being processed;
decision means adapted to decide, in a case where the virtual job is determined as not being processed by the information processing apparatus itself by the third determination means, another image processing apparatus other than the information processing apparatus itself to which a cancel instruction is to be transmitted subsequent to the information processing apparatus itself based on an order included in the cancel instruction in which the cancel instruction for the virtual job is to be transmitted to the plurality of image processing apparatuses; and
third transmission means adapted to transmit the cancel instruction for the virtual job to the other image processing apparatus which was decided by the decision means.

13. The image processing apparatus according to claim 12, further comprising fourth determination means adapted to determine whether or not end information indicating an end of the job is included in the virtual job currently being processed and which has been cancelled by the cancel means,
wherein in a case where the fourth determination means determines that the virtual job currently being processed and which has been cancelled includes end information, cancellation of the virtual job is concluded, and
in a case where the fourth determination means determines that the virtual job currently being processed and which has been cancelled does not include end information, the decision means is adapted to decide another image processing apparatus other than the information processing apparatus itself to which a cancel instruction is to be transmitted subsequent to the information processing apparatus itself based on the order included in the cancel instruction in which the cancel instruction for the virtual job is to be transmitted to the plurality of image processing apparatuses, and the third transmission means is adapted to transmit the cancel instruction for the virtual job to the other image processing apparatus which was decided by the decision means.

14. An information processing method of an image processing apparatus, comprising:
a reception step of receiving a cancel instruction for canceling a job;
a second determination step of determining whether or not the job as a target for the cancel instruction received in the reception step is a virtual job to be executed by cooperating functions of a plurality of image processing apparatuses;
a third determination step of determining, in a case where the job as a target for the cancel instruction is determined to be a virtual job in the second determination step, whether or not the virtual job is currently being processed by the information processing apparatus itself;
a cancel step of canceling, in a case where the virtual job is determined as being processed by the information processing apparatus itself in the third determination step, the virtual job currently being processed;
a decision step of deciding, in a case where the virtual job is determined as not being processed by the information processing apparatus itself in the third determination step, another image processing apparatus other than the information processing apparatus itself to which a cancel instruction is to be transmitted subsequent to the information processing apparatus itself based on an order included in the cancel instruction in which the cancel instruction for the virtual job is to be transmitted to the plurality of image processing apparatuses; and a third transmission step of transmitting the cancel instruction for the virtual job to the other image processing apparatus which was decided in the decision step.

15. The image processing method according to claim 14, further comprising a fourth determination step of determining whether or not end information indicating an end of the job is included in the virtual job currently being processed and which has been cancelled in the cancel step, wherein in a case where it is determined in the fourth determination step that the virtual job currently being processed and which has been cancelled includes end information, cancellation of the virtual job is concluded, and in a case where it is determined in the fourth determination step that the virtual job currently being processed and which has been cancelled does not include end information, another image processing apparatus other than the information processing apparatus itself to which a cancel instruction is to be transmitted subsequent to the information processing apparatus itself is decided in the decision step based on the order included in the cancel instruction in which the cancel instruction for the virtual job is to be transmitted to the plurality of image processing apparatuses, and in the third transmission step, the cancel instruction for the virtual job is transmitted to the other image processing apparatus which was decided in the decision step.

16. A non-transitory computer-readable storage medium which stores a computer-executable program for causing a computer to execute the steps of the information processing method according to claim 14.

17. An image processing apparatus comprising:

reception means adapted to receive, based on an issuance of a virtual job to be executed by cooperating functions of a plurality of image processing apparatuses, information indicating the virtual job issued to the plurality of image processing apparatuses which cooperates when executing the virtual job;

display control means adapted to display a list of jobs based on the information indicating the virtual job received by the reception means and information on a job input to the information processing apparatus itself;

fifth determination means adapted to determine, in a case where receiving a cancel instruction for the virtual job is received from the user based on the list of jobs displayed by the display control means, whether or not the virtual job is currently being processed by the information processing apparatus itself;

cancel means adapted to cancel, in a case where the virtual job is determined as being processed by the information processing apparatus itself by the fifth determination means, the virtual job currently being processed;

decision means adapted to decide, in a case where the virtual job is determined as not being processed by the information processing apparatus itself by the fifth determination means, another image processing apparatus other than the information processing apparatus itself to which a cancel instruction is to be transmitted based on information regarding the plurality of image processing apparatuses which cooperates to execute the virtual job and an order in which the cancel instruction for the virtual job is to be transmitted to the plurality of image processing apparatuses; and fourth transmission means adapted to transmit the cancel instruction for the virtual job to the other image processing apparatus which was decided by the decision means.

18. The image processing apparatus according to claim 17, further comprising sixth determination means adapted to determine whether or not end information indicating an end of the job is included in the virtual job currently being processed and which has been cancelled by the cancel means, wherein in a case where the sixth determination means determines that the virtual job currently being processed and which has been cancelled includes end information, cancellation of the virtual job is concluded, and in a case where the sixth determination means determines that the virtual job currently being processed and which has been cancelled does not include end information, the decision means is adapted to decide another image processing apparatus other than the information processing apparatus itself to which a cancel instruction is to be transmitted based on information regarding the plurality of image processing apparatuses which cooperates to execute the virtual job and the order in which the cancel instruction for the virtual job is to be transmitted to the plurality of image processing apparatuses, and the fourth transmission means is adapted to transmit the cancel instruction for the virtual job to the other image processing apparatus which was decided by the decision means.

19. An information processing method of an image processing apparatus, comprising:

a reception step of receiving, based on an issuance of a virtual job to be executed by cooperating functions of a plurality of image processing apparatuses, information indicating the virtual job issued to the plurality of image processing apparatuses which cooperates when executing the virtual job;

a display control step of displaying a list of jobs based on the information indicating the virtual job received in the reception step and information on a job input to the information processing apparatus itself;

a fifth determination step of determining, in a case where a cancel instruction for the virtual job is received from the user based on the list of jobs displayed in the display control step, whether or not the virtual job is currently being processed by the information processing apparatus itself;

a cancel step of canceling, in a case where the virtual job is determined as being processed by the information processing apparatus itself in the fifth determination step, the virtual job currently being processed;

a decision step of deciding, in a case where the virtual job is determined as not being processed by the information processing apparatus itself in the fifth determination step, another image processing apparatus other than the information processing apparatus itself to which a cancel instruction is to be transmitted based on information regarding the plurality of image processing apparatuses which cooperates to execute the virtual job and an order in which the cancel instruction for the virtual job is to be transmitted to the plurality of image processing apparatuses; and a fourth transmission step of transmitting the cancel instruction for the virtual job to the other image processing apparatus which was decided in the decision step.

20. The information processing method according to claim 19, further comprising a sixth determination step of determining whether or not end information indicating an end of the job is included in the virtual job currently being processed and which has been cancelled in the cancel step, wherein in a case where it is determined in the sixth determination step that the virtual job currently being processed and which has been cancelled includes end information, cancellation of the virtual job is concluded, and in a case where it is determined in the sixth determination step that the virtual job currently being processed and which has been cancelled does not include end information, another image processing apparatus other than the information processing apparatus itself to which a cancel instruction is to be transmitted is decided in the decision step based on information regarding the plurality of image processing apparatuses which cooperates to execute the virtual job and the order in which the cancel instruction for the virtual job is to be transmitted to the plurality of image processing apparatuses, and in the fourth transmission step, the cancel instruction for the virtual job is transmitted to the other image processing apparatus which was decided in the decision step.

21. A non-transitory computer-readable storage medium which stores a computer-executable program for causing a computer to execute the steps of the information processing method according to claim 19.

* * * * *